United States Patent
Yeh et al.

(10) Patent No.: US 12,438,631 B2
(45) Date of Patent: Oct. 7, 2025

(54) METHOD FOR ESTIMATING DISTRIBUTION OF WIRELESS SIGNAL STRENGTH, SELECTING MEASURING LOCATIONS TO MEASURE WIRELESS SIGNAL STRENGTH AND COMPENSATING ESTIMATED WIRELESS SIGNAL STRENGTH

(71) Applicant: Alpha Networks Inc., Hsinchu (TW)

(72) Inventors: Chia-Shuo Yeh, Hsinchu (TW); Chien-Hsiang Chen, Hsinchu (TW); Jen-Hung Yang, Hsinchu (TW); Shih-Fang Ao, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 354 days.

(21) Appl. No.: 18/224,271

(22) Filed: Jul. 20, 2023

(65) Prior Publication Data
US 2024/0048255 A1    Feb. 8, 2024

(30) Foreign Application Priority Data
Aug. 4, 2022    (TW) .................................. 111129343

(51) Int. Cl.
| | | |
|---|---|---|
| *H04B 17/382* | (2015.01) |
| *H04B 17/27* | (2015.01) |
| *H04B 17/318* | (2015.01) |
| *H04W 64/00* | (2009.01) |

(52) U.S. Cl.
CPC ........... *H04B 17/382* (2015.01); *H04B 17/27* (2015.01); *H04B 17/318* (2015.01); *H04W 64/006* (2013.01)

(58) Field of Classification Search
None
See application file for complete search history.

(56) References Cited

U.S. PATENT DOCUMENTS

| | | |
|---|---|---|
| 10,015,627 B1 | 7/2018 | Mossey et al. |
| 11,171,730 B2 | 11/2021 | Park et al. |
| 2014/0244817 A1 | 8/2014 | Pulleti et al. |
| 2016/0334498 A1* | 11/2016 | Jamieson ............ G01S 5/02213 |
| 2019/0158982 A1* | 5/2019 | Farnham ............. H04B 17/318 |

FOREIGN PATENT DOCUMENTS

| | | |
|---|---|---|
| CN | 102195724 | 12/2013 |
| CN | 108111440 | 6/2018 |
| CN | 110809247 | 2/2020 |

* cited by examiner

*Primary Examiner* — Walter J Divito
(74) *Attorney, Agent, or Firm* — WPAT, PC

(57) ABSTRACT

A method for estimating distribution of wireless signal strength, selecting measuring locations to measure wireless signal strength and compensating estimated wireless signal strength is provided, wherein the method for estimating distribution of wireless signal strength estimates the wireless signal strength at an estimation location in accordance with a plurality of single-reflection paths started from a signal emitter, the method for selecting position for measuring wireless signal strength determines whether a signal measuring process should be performed at the specific location, and the method for compensating estimated wireless signal strength compensates an estimated wireless signal strength near a specific location in accordance with a signal strength value measured at the specific location.

21 Claims, 27 Drawing Sheets

| Strength grade | Range (dbm) |
|---|---|
| 1 | [<0, >=-35] |
| 2 | [<-35, >=-40] |
| 3 | [<-40, >=-45] |
| 4 | [<-45, >=-50] |
| 5 | [<-50, >=-55] |
| 6 | [<-55, >=-60] |
| 7 | [<-60, >=-65] |
| 8 | [<-65, >=-70] |
| 9 | [<-70, >=-75] |
| 10 | [<-75, >=-80] |
| 11 | [<-80, >=-85] |
| 12 | [<-85] |

FIG. 8B

METHOD FOR ESTIMATING DISTRIBUTION OF WIRELESS SIGNAL STRENGTH, SELECTING MEASURING LOCATIONS TO MEASURE WIRELESS SIGNAL STRENGTH AND COMPENSATING ESTIMATED WIRELESS SIGNAL STRENGTH

FIELD OF THE INVENTION

The present invention relates to techniques for estimating wireless signal strength, specifically relates to a method for estimating distribution of wireless signal strength, selecting measuring locations to measure wireless signal strength and compensating estimated wireless signal strength.

BACKGROUND OF THE INVENTION

By applying the technology of transmitting data with wireless signals, people could work or do leisure activities in places where the wireless signals reach. Because data is transmitted by wireless signals, the speed and stability of data transmission is determined by the strength of the wireless signal. Therefore, it is an important subject to transmit the wireless signals to everywhere in a most suitable way while promoting wireless technologies.

In order to achieve the purpose of transmitting wireless signals to everywhere in the most suitable way, the network builders should know how the distribution of the wireless signal strength sent from a wireless signal transmitter is affected by the location where the transmitter is placed. A commonly used method that enables people to know the distribution of the wireless signal strength is to measure the wireless signal strength everywhere. However, it is time-consuming to do the measurement. Therefore, many approaches for estimating the wireless signal strength by applying various wireless signal propagation models, such as Free-Space Path Loss (FSPL) propagation model or International Telecommunication Union—Radio communication (ITU-R) P.1238 propagation model, is provided by current technology.

However, although an estimated distribution of wireless signal strength can be quickly obtained by applying the models listed above, there is a big difference between the estimated distribution of wireless signal strength and the result obtained by measuring. Therefore, it is still a topic to develop ways for estimating the wireless signal strength distribution more accurately.

SUMMARY OF THE INVENTION

In order to solve the problems existed in the technologies described above, a method for estimating distribution of wireless signal strength, selecting measuring locations to measure wireless signal strength and compensating estimated wireless signal strength such that approaches for estimating wireless signal strengths around a wireless signal source and determining whether an operation for measuring signal strength should be performed for a position in accordance with environment around the position or signal differences between the position and other positions nearby is provided by the present invention.

In one aspect, the present invention provides a method for estimating distribution of wireless signal strength, which is adapted to estimating a signal strength distribution of a wireless signal emitted from a signal emitter within a specific area in accordance with a planar view of the specific area, wherein the planar view shows partition walls, doors and passage within the specific area. The method comprises: deciding a plurality of estimation locations within the specific area; performing an estimation operation for each of the estimation locations; and determining the signal strength distribution within the specific area in accordance with a plurality of estimated signal strengths corresponding to the estimation locations, wherein, the estimation operation performed for a current estimation location, which is one of the estimation locations, comprises: determining whether the current estimation location is within line of sight of the signal emitter; performing a first estimation procedure for estimating the estimated signal strength in the current estimation location when the current estimation location is within line of sight of the signal emitter; and performing a second estimation procedure for estimating the estimated signal strength in the current estimation location when the current estimation location is not within line of sight of the signal emitter, wherein the first estimation procedure is different from the second estimation procedure, and the first estimation procedure estimates the estimated signal strength in the current estimation location by considering at least two single-reflection paths starting from the signal emitter to the current estimation location.

In one embodiment, the first estimation procedure estimates the estimated signal strength in the current estimation location by considering all single-reflection paths starting from the signal emitter to the current estimation location.

In one embodiment, the method further comprises following steps before determining the signal strength distribution within the specific area in accordance with the plurality of the estimated signal strengths corresponding to the estimation locations: performing a location selecting operation to select at least one actual measuring location from the estimation locations; and performing a signal renew operation for each of the at least one actual measuring location to record a signal measurement value obtained by measuring the wireless signal in corresponding one of the at least one actual measuring location.

In one embodiment, the signal renew operation comprises measuring a wireless signal strength of the wireless signal in the actual measuring location to obtain the signal measurement value corresponding to the actual measuring location; and replacing the estimated signal strength corresponding to the actual measuring location with the signal measurement value corresponding to the actual measuring location after storing the estimated signal strength corresponding to the actual measuring location as a former-estimated signal strength corresponding to the actual measuring location.

In one embodiment, the location selecting operation comprises selecting one of the estimation locations which have not been considered by the location selecting operation as a determining location, and performing a determination operation for the determining location. Wherein, the determination operation comprises when a position of the determining location is conformed to a preset rule, setting the determining location as one of the at least one actual measuring location and closing the determination operation performed for the determining location; and, when the position of the determining location is not conformed to the preset rule: generating a differential weight corresponding to the determining location by summing a signal differential value and a variation value, wherein the signal differential value is a summation of at least one absolute value of differential, each of which is obtained from comparing a location signal strength and a neighboring-location signal strength, and the variation value is a coefficient of variation of a set composed of all the estimated signal strengths, each of which corresponds to one of the estimation locations within a specific range around the determining location, wherein the location signal strength is the estimated signal strength corresponding to the determining location, and the neighboring-location signal strength is the estimated signal strength corresponding to a neighboring location which is neighboring directly to the determining location and is closer to the signal emitter than the determining location is; generating a location differential threshold corresponding to the determining location by summing a signal differential threshold and a variation threshold, wherein the signal differential threshold corresponding to the determining location is a predetermined value, and the variation threshold is determined in accordance with the location signal strength and a parameter set determined previously; when the differential weight is greater than the location differential threshold, setting the determining location as one of the at least one actual measuring location and closing the determination operation performed for the determining location; and when the differential weight is not greater than the location differential threshold, closing the determination operation performed for the determining location.

In one embodiment, the step of when the position of the determining location is conformed to the preset rule, setting the determining location as one of the at least one actual measuring location and closing the determination operation performed for the determining location, comprises: when the position of the determining location is in one concave corner of the specific area, setting the determining location as one of the at least one actual measuring location and closing the determination operation performed for the determining location; when the position of the determining location is in one corner of the specific area and is not neighboring to any of the estimation locations located in anyone concave corner of the specific area, setting the determining location as one of the at least one actual measuring location and closing the determination operation performed for the determining location; when the position of the determining location is in front of one closed door of the specific area, setting the determining location as one of the at least one actual measuring location and closing the determination operation performed for the determining location; when the position of the determining location is within any passage of the specific area or near any entrance of any passage of the specific area, setting the determining location as one of the at least one actual measuring location and closing the determination operation performed for the determining location; and when the position of the determining location is in front of or in either side in front of one opened door of the specific area, setting the determining location as one of the at least one actual measuring location and closing the determination operation performed for the determining location.

In one embodiment, the method further comprising following steps before generating the differential weight corresponding to the determining location by summing the signal differential value and the variation value: obtaining the variation value; and obtaining the signal differential value. Wherein, the signal differential value is obtained by steps comprising: selecting, from a plurality of strength grades, a current strength grade in which the location signal strength is included; for each of the at least one neighboring-location signal strength, selecting, from the strength grades, a neighbor grade in which the neighboring-location signal strength is included and calculating absolute value of differential between the current strength grade and the neighbor grade to generate a differential component value; and generating the signal differential value by summing all the differential component values, each of which corresponds to one of the at least one neighboring-location signal strength.

In one embodiment, the step in which the variation threshold is determined in accordance with the location signal strength and the parameter set determined previously comprises: calculating a first variation threshold component, wherein the first variation threshold component is a coefficient of variation of a first data set including a first amount of data each being the location signal strength and a second amount of data each being the location signal strength plus a preset value; calculating a second variation threshold component, wherein the second variation threshold component is a coefficient of variation of a second data set including the first amount of data each being the location signal strength and the second amount of data each being the location signal strength minus the preset value; calculating a third variation threshold component, wherein the third variation threshold component is a coefficient of variation of a third data set including the second amount of data each being the location signal strength and a first amount of data each being the location signal strength plus the preset value; calculating a fourth variation threshold component, wherein the fourth variation threshold component is a coefficient of variation of a fourth data set including the second amount of data each being the location signal strength and a first amount of data each being the location signal strength minus the preset value; and generating the variation threshold by averaging the first variation threshold component, the second variation threshold component, the third variation threshold component and the fourth variation threshold component, wherein, the first amount is different from the second amount, and summation of the first amount and the second amount equals to an amount of the estimation locations located within the specific range.

In one embodiment, the signal differential threshold of the determining location within line of sight of the signal emitter is different from the signal differential threshold of the determining location out of line of sight of the signal emitter.

In one embodiment, the method further comprises following steps after performing the signal renew operation and before determining the signal strength distribution within the specific area in accordance with the plurality of the estimated signal strengths corresponding to the estimation locations: taking each of the estimation locations without corresponded former-estimated signal strength as a signal compensation location; performing a first-phase compensation operation for the signal compensation location in accordance with the estimated signal strength and the former-estimated signal strength corresponding to the at least one actual measuring location within a specific range around the signal compensation location to obtain a compensated signal strength corresponding to the signal compensation location and then replace the estimated signal strength corresponding to the signal compensation location with the compensated signal strength corresponding to the signal compensation location when an amount of the at least one actual measuring location within the specific range around the signal compensation location is not less than a first preset amount; and performing at least one second-phase compensation operation for the signal compensation location in accordance with an amount of the estimation locations, which are within the specific range around the signal compensation location and are with corresponded former-estimated signal strengths, and the position and an amount of the at least one actual measuring location neighboring to the signal compensation location to obtain the compensated signal strength corresponding to the signal compensation location and to replace the estimated signal strength corresponding to the signal compensation location with the compensated signal strength corresponding to the signal compensation location after the first-phase compensation operation is performed for all the estimation locations suitable for performing the first-phase compensation operation when the amount of the at least one actual measuring location within the specific range around the signal compensation location is less than the first preset amount.

In one embodiment, the first-phase compensation operation comprises generating a first compensation value corresponding to the signal compensation location by averaging a plurality of first results corresponding to all the at least one actual measuring location within the specific range around the signal compensation location, wherein each of the first results is corresponded to one of the at least one actual measuring location within the specific range around the signal compensation location and is obtained from subtracting the estimated signal strength corresponding to the corresponded actual measuring location from the former-estimated signal strength corresponding to the corresponded actual measuring location; generating the compensated signal strength corresponding to the signal compensation location by subtracting the first compensation value corresponding to the signal compensation location from the estimated signal strength corresponding to the signal compensation location; and closing the first-phase compensation operation performed for the signal compensation location after storing the estimated signal strength corresponding to the signal compensation location as the former-estimated signal strength corresponding to the signal compensation location before replacing the estimated signal strength corresponding to the signal compensation location with the compensated signal strength corresponding to the signal compensation location.

In one embodiment, a target group considered by the second-phase compensation operation comprises the estimation locations, each of which is without the former-estimated signal strength corresponded thereto, and, after all the estimation locations within the target group are considered by the second-phase compensation operation, the target group is renewed and the second-phase compensation operation is performed to consider all the estimation locations within the renewed target group until each of the estimation locations is with the former-estimated signal strength corresponded thereto. Furthermore, the second-phase compensation operation comprises closing the second-phase compensation operation performed for the signal compensation location under a first situation, in which each of the estimation locations within the specific range around the signal compensation location is without the former-estimated signal strength corresponded thereto; performing a first-sub-phase compensation operation for the signal compensation location under a second situation, in which the amount of the estimation locations, which are within the specific range around the signal compensation location and are with corresponded former-estimated signal strengths, is less than a second preset amount and not equal to zero, or, when the amount of the estimation locations, which are within the specific range around the signal compensation location and are with corresponded former-estimated signal strengths, is not less than the second preset amount but a second result obtained by subtracting an amount of the actual measuring location neighboring indirectly to the signal compensation location from the amount of the estimation locations, which are within the specific range around the signal compensation location and are with corresponded former-estimated signal strengths, is less than the second preset amount; and performing a second-sub-phase compensation operation for the signal compensation location under a third situation comprising all situations except the first and second situations. Furthermore, the first-sub-phase compensation operation comprises selecting a compensation reference location, wherein the compensation reference location is one of the estimation locations with the former-estimated signal strength corresponded thereto and within the specific range around the signal compensation location, and a straight-line distance between the compensation reference location and the signal emitter is shorter than the straight-line between anyone of the estimation locations, which is with the former-estimated signal strength corresponded thereto and within the specific range around the signal compensation location, and the signal emitter; generating a second compensation value by subtracting the estimated signal strength corresponding to the compensation reference location from the former-estimated signal strength corresponding to the compensation reference location; generating the compensated signal strength corresponding to the signal compensation location by subtracting the second compensation value from the estimated signal strength corresponding to the signal compensation location; and closing the second-phase compensation operation performed for the signal compensation location after storing the estimated signal strength corresponding to the signal compensation location as the former-estimated signal strength corresponding to the signal compensation location before replacing the estimated signal strength corresponding to the signal compensation location with the compensated signal strength corresponding to the signal compensation location. Furthermore, the second-sub-phase compensation operation comprises generating a first summation by adding the former-estimated signal strengths each corresponding to one of the estimation locations with the former-estimated signal strength corresponded thereto and neighboring directly to the signal compensation location and the former-estimated signal strengths each corresponding to one of the at least one actual measuring location neighboring indirectly to the signal compensation location; generating a second summation by adding the estimated signal strengths each corresponding to one of the estimation locations with the former-estimated signal strength corresponded thereto and neighboring directly to the signal compensation location and the estimated signal strengths each corresponding to one of the at least one actual measuring location neighboring indirectly to the signal compensation location; generating a first differential value by subtracting the second summation from the first summation; generating a third compensation value by dividing the first differential value by the third summation; generating the compensated signal strength corresponding to the signal compensation location by subtracting the third compensation value from the estimated signal strength corresponding to the signal compensation location; and closing the second-phase compensation operation performed for the signal compensation location after storing the estimated signal strength corresponding to the signal compensation location as the former-estimated signal strength corresponding to the signal compensation location before replacing the estimated signal strength corresponding to the signal compensation location with the compensated signal strength corresponding to the signal compensation location.

In one embodiment, the method further comprises drawing a diagram in accordance with the signal strength distribution within the specific area.

In another aspect, the present invention provides a method for selecting measuring locations to measure wireless signal strength, which is adapted to estimating a signal strength distribution of a wireless signal emitted from a signal emitter within a specific area in accordance with a planar view of the specific area, wherein the planar view shows partition walls, doors and passage within the specific area. The method comprises: deciding a plurality of estimation locations within the specific area, wherein each of the estimation locations is with an estimated signal strength corresponded thereto; and selecting one of the estimation locations which have not been considered by a location selecting operation as a determining location, and performing a determination operation for the determining location. Furthermore, the determination operation comprises: when a position of the determining location is conformed to a preset rule, setting the determining location as one of at least one actual measuring location and closing the determination operation performed for the determining location; and, when the position of the determining location is not conformed to the preset rule, comprising the steps of: generating a differential weight corresponding to the determining location by summing a signal differential value and a variation value, wherein the signal differential value is a summation of at least one absolute value of differential, each of which is obtained from comparing a location signal strength and a neighboring-location signal strength, and the variation value is a coefficient of variation of a set composed of all the estimated signal strengths, each of which corresponds to one of the estimation locations within a specific range around the determining location, wherein the location signal strength is the estimated signal strength corresponding to the determining location, and the neighboring-location signal strength is the estimated signal strength corresponding to a neighboring location which is neighboring directly to the determining location and is closer to the signal emitter than the determining location is; generating a location differential threshold corresponding to the determining location by summing a signal differential threshold and a variation threshold, wherein the signal differential threshold corresponding to the determining location is a predetermined value, and the variation threshold is determined in accordance with the location signal strength and a parameter set determined previously; when the differential weight is greater than the location differential threshold, setting the determining location as one of the at least one actual measuring location and closing the determination operation performed for the determining location; and when the differential weight is not greater than the location differential threshold, closing the determination operation performed for the determining location.

In one embodiment, the step of when the position of the determining location is conformed to the preset rule, setting the determining location as one of the at least one actual measuring location and closing the determination operation performed for the determining location, comprises: when the position of the determining location is in one concave corner of the specific area, setting the determining location as one of the at least one actual measuring location and closing the determination operation performed for the determining location; when the position of the determining location is in one corner of the specific area and is not neighboring to any of the estimation locations located in any concave corner of the specific area, setting the determining location as one of the at least one actual measuring location and closing the determination operation performed for the determining location; when the position of the determining location is in front of one closed door of the specific area, setting the determining location as one of the at least one actual measuring location and closing the determination operation performed for the determining location; when the position of the determining location is within any passage of the specific area or near any entrance of any passage of the specific area, setting the determining location as one of the at least one actual measuring location and closing the determination operation performed for the determining location; and when the position of the determining location is in front of or in either side in front of one opened door of the specific area, setting the determining location as one of the at least one actual measuring location and closing the determination operation performed for the determining location.

In one embodiment, before generating the differential weight corresponding to the determining location by summing the signal differential value and the variation value, the method further comprises obtaining the variation value; and obtaining the signal differential value, wherein the step of obtaining the signal differential value comprises selecting, from a plurality of strength grades, a current strength grade in which the location signal strength is included; for each of the at least one neighboring-location signal strength, selecting, from the strength grades, a neighbor grade in which the neighboring-location signal strength is included and calculating absolute value of differential between the current strength grade and the neighbor grade to generate a differential component value; and generating the signal differential value by summing all the differential component values, each of which corresponds to one of the at least one neighboring-location signal strength.

In one embodiment, the step in which the variation threshold is determined in accordance with the location signal strength and the parameter set determined previously comprises calculating a first variation threshold component, wherein the first variation threshold component is a coefficient of variation of a first data set including a first amount of data each being the location signal strength and a second amount of data each being the location signal strength plus a preset value; calculating a second variation threshold component, wherein the second variation threshold component is a coefficient of variation of a second data set including the first amount of data each being the location signal strength and the second amount of data each being the location signal strength minus the preset value; calculating a third variation threshold component, wherein the third variation threshold component is a coefficient of variation of a third data set including the second amount of data each being the location signal strength and a first amount of data each being the location signal strength plus the preset value; calculating a fourth variation threshold component, wherein the fourth variation threshold component is a coefficient of variation of a fourth data set including the second amount of data each being the location signal strength and a first amount of data each being the location signal strength minus the preset value; and generating the variation threshold by averaging the first variation threshold component, the second variation threshold component, the third variation threshold component and the fourth variation threshold component, wherein the first amount is different from the second amount, and summation of the first amount and the second amount equals to an amount of the estimation locations located within the specific range.

In one embodiment, the signal differential threshold of the determining location within line of sight of the signal emitter is different from the signal differential threshold of the determining location out of line of sight of the signal emitter.

In another aspect, the present invention provides a method for compensating estimated wireless signal strength, which is adapted to estimating a signal strength distribution of a wireless signal emitted from a signal emitter within a specific area in accordance with a planar view of the specific area, wherein, a plurality of estimation locations are located within the specific area, each of the estimation locations is with an estimated signal strength corresponded thereto, and at least one of the estimation locations is set as an actual measuring location and is with a former-estimated signal strength corresponded thereto. The method comprises taking each of the estimation locations without the former-estimated signal strength corresponded thereto as a signal compensation location; performing a first-phase compensation operation for the signal compensation location in accordance with the estimated signal strengths and the former-estimated signal strengths corresponding to all the actual measuring locations within a specific range around the signal compensation location to obtain a compensated signal strength corresponding to the signal compensation location and then replace the estimated signal strength corresponding to the signal compensation location with the compensated signal strength corresponding to the signal compensation location when an amount of the actual measuring location within the specific range around the signal compensation location is not less than a first preset amount; and performing at least one second-phase compensation operation for the signal compensation location in accordance with an amount of the estimation locations, which are within the specific range around the signal compensation location and are with corresponded former-estimated signal strengths, and the position and an amount of the actual measuring locations neighboring to the signal compensation location to obtain the compensated signal strength corresponding to the signal compensation location and to replace the estimated signal strength corresponding to the signal compensation location with the compensated signal strength corresponding to the signal compensation location after the first-phase compensation operation is performed for all the estimation locations suitable for performing the first-phase compensation operation when the amount of the actual measuring locations within the specific range around the signal compensation location is less than the first preset amount.

In one embodiment, the first-phase compensation operation comprises generating a first compensation value corresponding to the signal compensation location by averaging a plurality of first results corresponding to all the actual measuring locations within the specific range around the signal compensation location, wherein each of the first results is corresponded to one of the actual measuring locations within the specific range around the signal compensation location and is obtained from subtracting the estimated signal strength corresponding to the corresponded actual measuring location from the former-estimated signal strength corresponding to the corresponded actual measuring location; generating the compensated signal strength corresponding to the signal compensation location by subtracting the first compensation value corresponding to the signal compensation location from the estimated signal strength corresponding to the signal compensation location; and closing the first-phase compensation operation performed for the signal compensation location after storing the estimated signal strength corresponding to the signal compensation location as the former-estimated signal strength corresponding to the signal compensation location before replacing the estimated signal strength corresponding to the signal compensation location with the compensated signal strength corresponding to the signal compensation location.

In one embodiment, a target group considered by the second-phase compensation operation comprises the estimation locations, each of which is without the former-estimated signal strength corresponded thereto, and, after all the estimation locations within the target group are considered by the second-phase compensation operation, the target group is renewed and the second-phase compensation operation is performed to consider all the estimation locations within the renewed target group until each of the estimation locations is with the former-estimated signal strength corresponded thereto. Wherein, the second-phase compensation operation comprises closing the second-phase compensation operation performed for the signal compensation location under a first situation, in which each of the estimation locations within the specific range around the signal compensation location is without the former-estimated signal strength corresponded thereto; performing a first-sub-phase compensation operation for the signal compensation location under a second situation, in which the amount of the estimation locations, which are within the specific range around the signal compensation location and are with corresponded former-estimated signal strengths, is less than a second preset amount and not equal to zero, or, when the amount of the estimation locations, which are within the specific range around the signal compensation location and are with corresponded former-estimated signal strengths, is not less than the second preset amount but a second result obtained by subtracting an amount of the actual measuring location neighboring indirectly to the signal compensation location from the amount of the estimation locations, which are within the specific range around the signal compensation location and are with corresponded former-estimated signal strengths, is less than the second preset amount; and performing a second-sub-phase compensation operation for the signal compensation location under a third situation, which comprises all situations except the first and second situations. Furthermore, the first-sub-phase compensation operation comprises selecting a compensation reference location, wherein the compensation reference location is one of the estimation locations with the former-estimated signal strength corresponded thereto and within the specific range around the signal compensation location, and a straight-line distance between the compensation reference location and the signal emitter is shorter than the straight-line between anyone of the estimation locations, which is with the former-estimated signal strength corresponded thereto and within the specific range around the signal compensation location, and the signal emitter; generating a second compensation value by subtracting the estimated signal strength corresponding to the compensation reference location from the former-estimated signal strength corresponding to the compensation reference location; generating the compensated signal strength corresponding to the signal compensation location by subtracting the second compensation value from the estimated signal strength corresponding to the signal compensation location; and closing the second-phase compensation operation performed for the signal compensation location after storing the estimated signal strength corresponding to the signal compensation location as the former-estimated signal strength corresponding to the signal compensation location before replacing the estimated signal strength corresponding to the signal compensation location with the compensated signal strength corresponding to the signal compensation location. Furthermore, the second-sub-phase compensation operation comprises generating a first summation by adding the former-estimated signal strengths each corresponding to one of the estimation locations with the former-estimated signal strength corresponded thereto and neighboring directly to the signal compensation location and the former-estimated signal strengths each corresponding to one of the actual measuring locations neighboring indirectly to the signal compensation location; generating a second summation by adding the estimated signal strengths each corresponding to one of the estimation locations with the former-estimated signal strength corresponded thereto and neighboring directly to the signal compensation location and the estimated signal strengths each corresponding to one of the actual measuring locations neighboring indirectly to the signal compensation location; generating a third summation by adding an amount of the estimation locations and an amount of the at least one actual measuring location neighboring indirectly to the estimation location, wherein each of the amount of the estimation locations is with the former-estimated signal strength corresponded thereto and neighboring directly to the signal compensation location; generating a first differential value by subtracting the second summation from the first summation; generating a third compensation value by dividing the first differential value by the third summation; generating the compensated signal strength corresponding to the signal compensation location by subtracting the third compensation value from the estimated signal strength corresponding to the signal compensation location; and closing the second-phase compensation operation performed for the signal compensation location after storing the estimated signal strength corresponding to the signal compensation location as the former-estimated signal strength corresponding to the signal compensation location before replacing the estimated signal strength corresponding to the signal compensation location with the compensated signal strength corresponding to the signal compensation location.

In summary, by using the method for estimating distribution of wireless signal strength, selecting measuring locations to measure wireless signal strength and compensating estimated wireless signal strength provided by the present invention, the signal strength distribution could be roughly estimated by using a plurality of single-reflection paths, and some positions within the specific area could be selected for performing signal measuring such that signal strength distribution in each location could be further estimated by using the method for compensating estimated wireless signal strength with the measured signal strength and the roughly estimated signal strength. The number of operations performed for measuring could be reduced by using the technology provided in the present invention such that the time and manpower needed for determining the wireless signal strength is reduced. Furthermore, by applying the signal strength estimating method different from those used in prior art, the present invention could also estimate the wireless signal strength accurately.

BRIEF DESCRIPTION OF THE DRAWINGS

The invention will become more readily apparent to those ordinarily skilled in the art after reviewing the following detailed description and accompanying drawings, in which:

FIG. 8B is a grade table used in the step S710 of the embodiment shown in FIG. 7A in accordance with one embodiment of the present invention.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
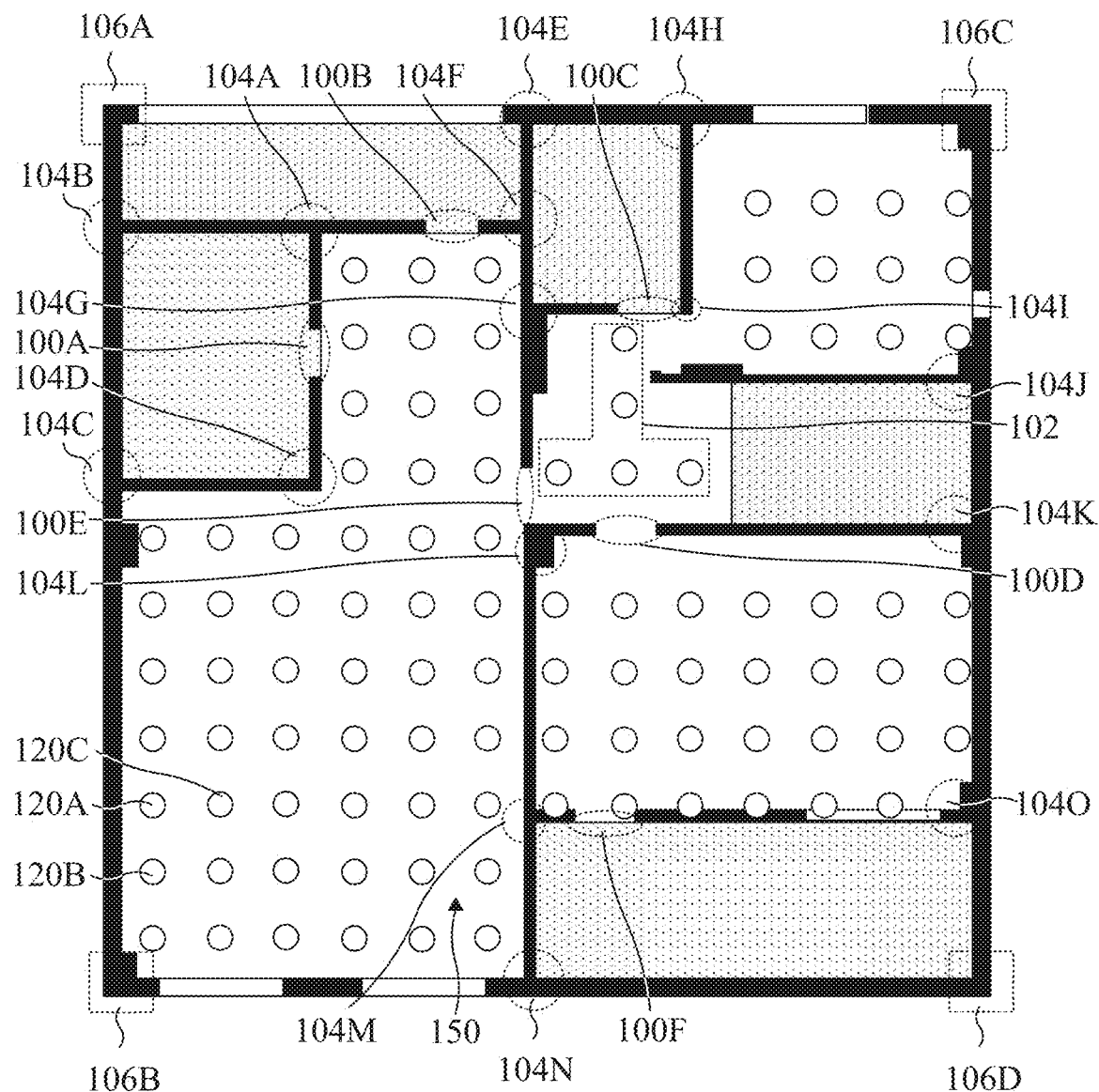
FIG. 1 is a planar view of a specific area in which the signal strength distribution estimation in accordance with one embodiment of the present invention is performed.

Please refer to FIG. 1, which is a planar view of a specific area in which the signal strength distribution estimation in accordance with one embodiment of the present invention is performed. Wherein, the specific area 10 is divided into several blocks by obstacles such as partition walls and doors. When a signal strength distribution to be discussed is the space within the specific area 10 except the areas with dots, some estimation locations within the space, such as the estimation locations 120A, 120B, 120C and etc., should be decided and estimation of the signal strength distribution within the specific area 10 and generated by the wireless signal transmitted from the signal emitter 150 could be started basing on these estimation locations.

In order to estimate the signal strength distribution effectively, some rules should be followed while deciding the estimation locations. For example, the estimation locations are arranged in a two-dimensional matrix distributed in vertical and horizontal directions and the distance between two estimation locations neighboring directly is fixed, such as keeping the distance to be 1 meter in the actual environment in this embodiment. It should be noted that the term "neighboring directly" in the specification means that two locations are adjacent either in the horizontal direction or the vertical direction, for example, the estimation location 120A is neighboring directly to the estimation location 120B, and the estimation location 120A is neighboring directly to the estimation location 120C. In addition, the obliquely adjacent estimation location 120B and estimation location 120C are referred to as "neighboring indirectly" in the following.

Figure 2:
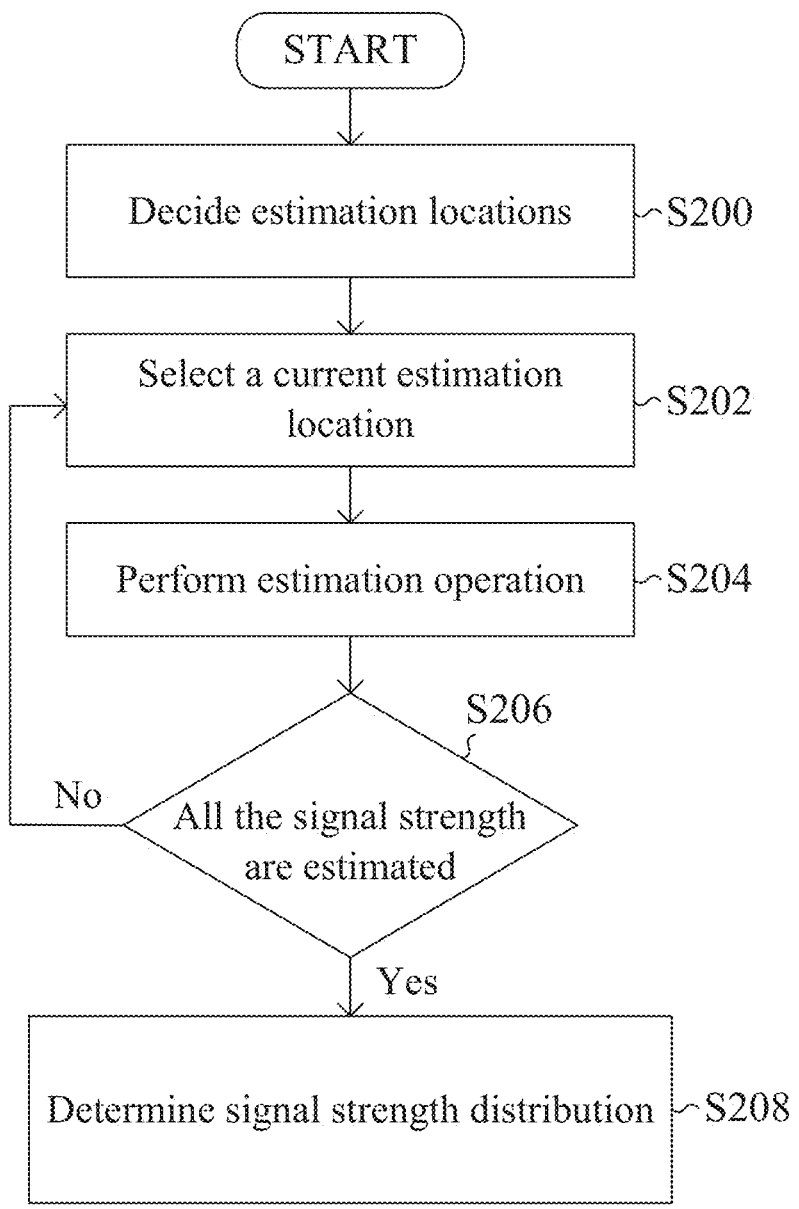
FIG. 2 is a flow chart of a method for estimating distribution of wireless signal strength in accordance with one embodiment of the present invention.

Please refer together to FIG. 2, which is a flow chart of a method for estimating distribution of wireless signal strength in accordance with one embodiment of the present invention. In the embodiment, the method for estimating distribution of wireless signal strength firstly decides a plurality of estimation locations within the specific area 10 (Step S200). After deciding the estimation locations, one of the estimation locations in which the signal strength is not estimated yet is selected as a current estimation location (Step S202). After the step S202 is completed, an estimation operation is performed for the current estimation location to estimate the signal strength therein (Step S204). After the estimation operation performed for the current estimation location is completed, the method for estimating distribution of wireless signal strength in this embodiment would determine whether the signal strengths in all the estimation locations are estimated in the step S206. When it is determined in the step S206 that the signal strengths in all the estimation locations are estimated, the flow enters the step S208 to determine the signal strength distribution within the specific area 10 in accordance with the estimated signal strength in each of the estimation locations. On the contrary, when it is determined in the step S206 that at least one of the signal strengths in all the estimation locations is not estimated yet, the flow goes back to the step S202 to select one of the estimation locations which have not been considered by the estimation operation as the current estimation location such that the estimation operation could be further performed for the newly selected current estimation location.

The estimation operation performed in the step S204 could be different in different embodiments. Please refer to FIG. 3, which is a flow chart of an estimation operation performed in the method for estimating distribution of wireless signal strength in accordance with one embodiment of the present invention. In this embodiment, after one of the estimation locations which have not been considered by the estimation operation is selected as the current estimation location in step S202, the flow enters the step S300 to determine whether the position of the current estimation location is within the line of sight (LOS) of the signal emitter 150. When the position of the current estimation location is within the line of sight of the signal emitter 150, the step S302 of the estimation operation provided by this embodiment is performed to estimate the estimated signal strength in the current estimation location by using a first estimation procedure. On the contrary, when the position of the current estimation location is not within the line of sight of the signal emitter 150, the step S304 of the estimation operation provided by this embodiment is performed to estimate the estimated signal strength in the current estimation location by using a second estimation procedure different from the first estimation procedure.

It is noted that the first estimation procedure and the second estimation procedure could be realized by using any wireless signal propagation models including but not limited to Free-Space Path Loss (FSPL) propagation model or International Telecommunication Union—Radio communication (ITU-R) P.1238 propagation model.

In one embodiment, the International Telecommunication Union—Radio communication (ITU-R) P.1238 propagation model is applied as the second estimation procedure to estimate the estimated signal strength in the estimation location not within the line of sight of the signal emitter 150, and a multi-ray reflection propagation model which considers a direct path starting from the signal emitter 150 to the current estimation location in a straight line and at least two single-reflection paths starting from the signal emitter 150 to the current estimation location with only one reflection is applied as the first estimation procedure to estimate the estimated signal strength in the estimation location within the line of sight of the signal emitter 150.

Figure 4:
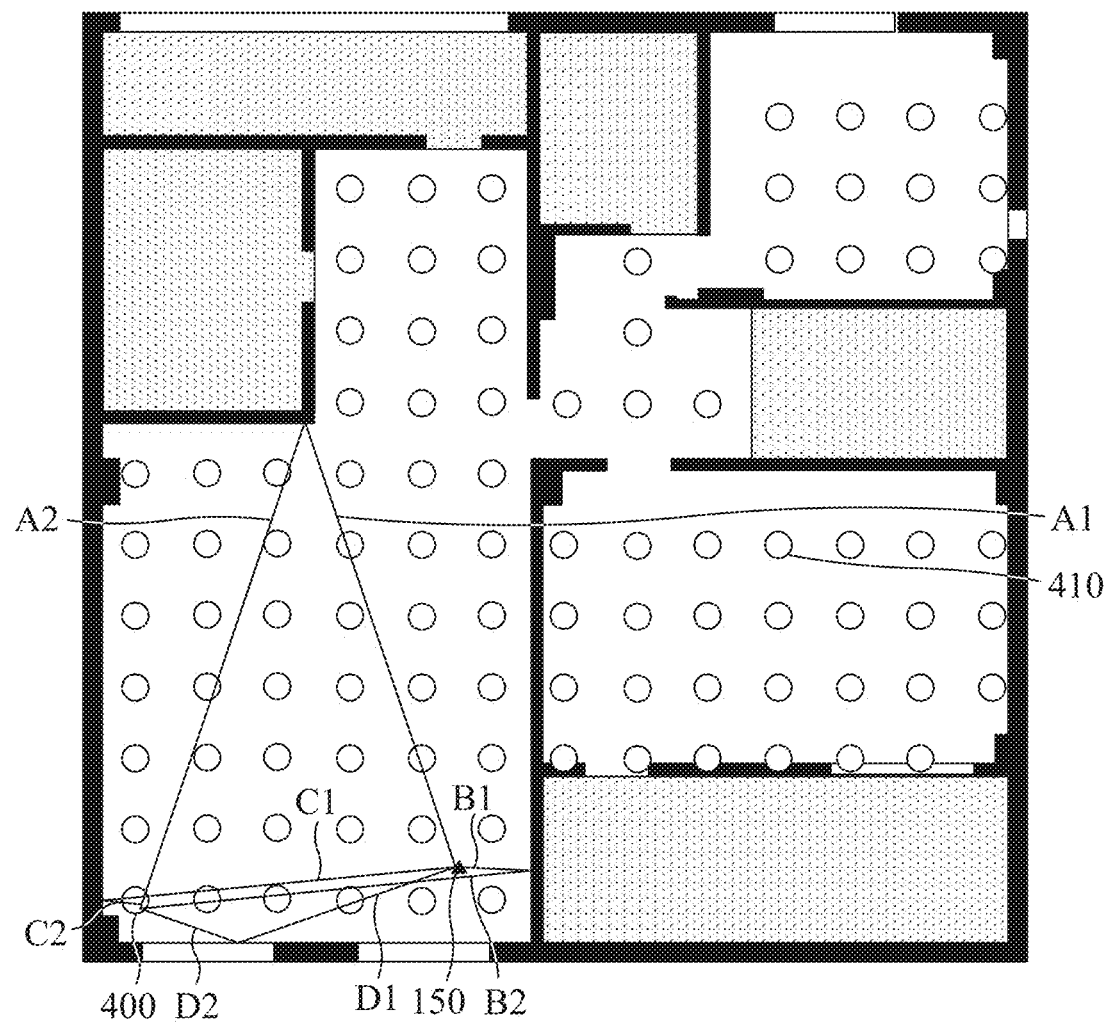
FIG. 4 is a schematic diagram shown single-reflection paths considered in the method for estimating distribution of wireless signal strength in accordance with one embodiment of the present invention.

For example, please refer to FIG. 4, when the signal strength in the estimation location 410 is going to be estimated, that is, the estimation location 410 is selected as the current estimation location, the ITU-R P.1238 propagation model is applied for estimation to obtain the estimated signal strength in the estimation location 410 since the estimation location 410 is not within the line of sight of the signal emitter 150. Moreover, when the signal strength in the estimation location 400 is going to be estimated, that is, the estimation location 400 is selected as the current estimation location, at least two single-reflection paths could be considered for estimation to obtain the estimated signal strength in the estimation location 400 since the estimation location 400 is within the line of sight of the signal emitter 150, wherein, the single-reflection paths considered for estimating the estimated signal strength could comprises the single-reflection path starting from the signal emitter 150, through the incident path A1 and the reflection path A2 and finally to the estimation location 400, the single-reflection path starting from the signal emitter 150, through the incident path B1 and the reflection path B2 and finally to the estimation location 400, the single-reflection path starting from the signal emitter 150, through the incident path C1 and the reflection path C2 and finally to the estimation location 400, the single-reflection path starting from the signal emitter 150, through the incident path D1 and the reflection path D2 and finally to the estimation location 400, the single-reflection path starting from the signal emitter 150 to the estimation location 400 through only one reflection from the ceiling (not shown in FIG. 4), or the single-reflection path starting from the signal emitter 150 to the estimation location 400 through only one reflection from the floor (not shown in FIG. 4). At least two of the single-reflection paths described above could be considered while applying the multi-ray reflection propagation model for estimating the estimated signal strength in the estimation location 400.

It is noted that although a more accurate result could be achieved by considering all the single-reflection paths while estimating the signal strength, a part of the single-reflection paths could be omitted for the purpose of saving time cost for performing estimation. It is suggested in this embodiment that at least two single-reflection paths are considered while estimating the signal strength.

Figure 3:
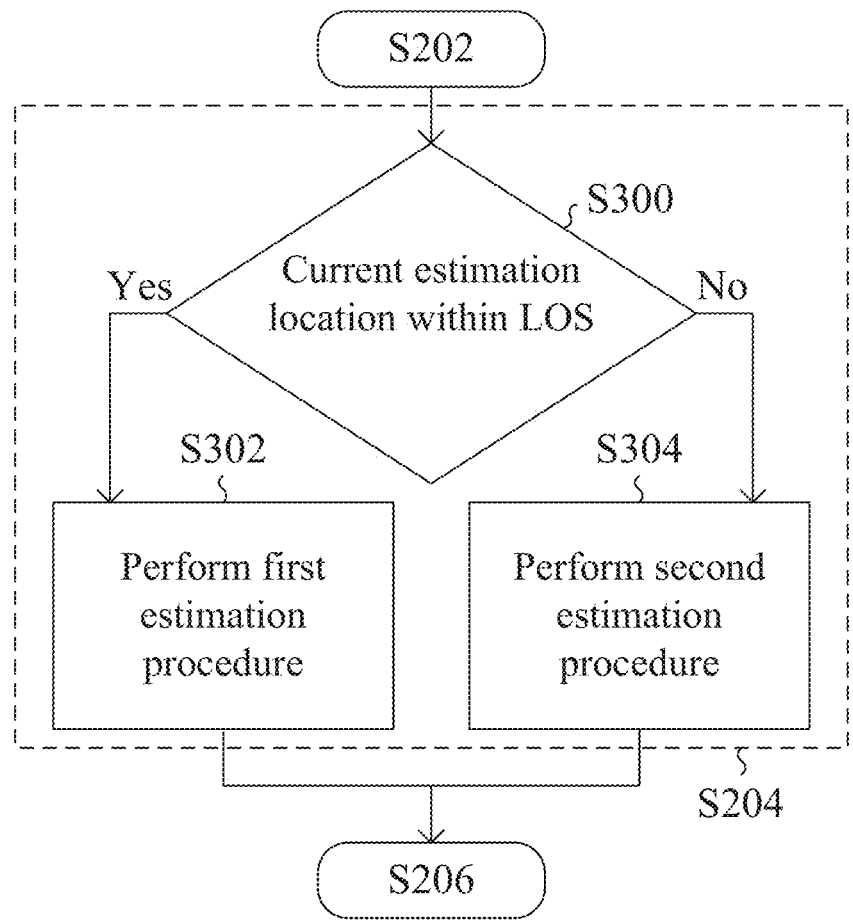
FIG. 3 is a flow chart of an estimation operation performed in the method for estimating distribution of wireless signal strength in accordance with one embodiment of the present invention.

In accordance with the description made above, those with ordinary skill in the art could obtain the estimated signal strength in corresponding one of the estimation locations without measuring the signal strength therein in accordance with the technical solution provided in FIG. 2 and FIG. 3. After that, the signal strength distribution within the specific area 10 could be determined in accordance with the estimated signal strengths in the estimation locations. Furthermore, a diagram, such as heat map, could be drawn in accordance with the signal strength distribution within the specific area.

In order to obtain more accurate signal strength distribution, it is possible to further select a part of the estimation location to perform operation for measuring the signal strengths therein and improve the estimated signal strengths basing on the measured signal strengths. It is well known to those skilled in the art that, on one hand, a lot of time would be spent when a quantity of the estimation locations selected for performing signal strength measurement operation is too large, and, on the other hand, it would be hard to improve accuracy of the estimated signal strengths when the quantity of the estimation locations selected for performing signal strength measurement operation is too little. Therefore, it is also very important that how the estimation locations in which the signal strength measurement operation is performed are selected.

Figure 5A:
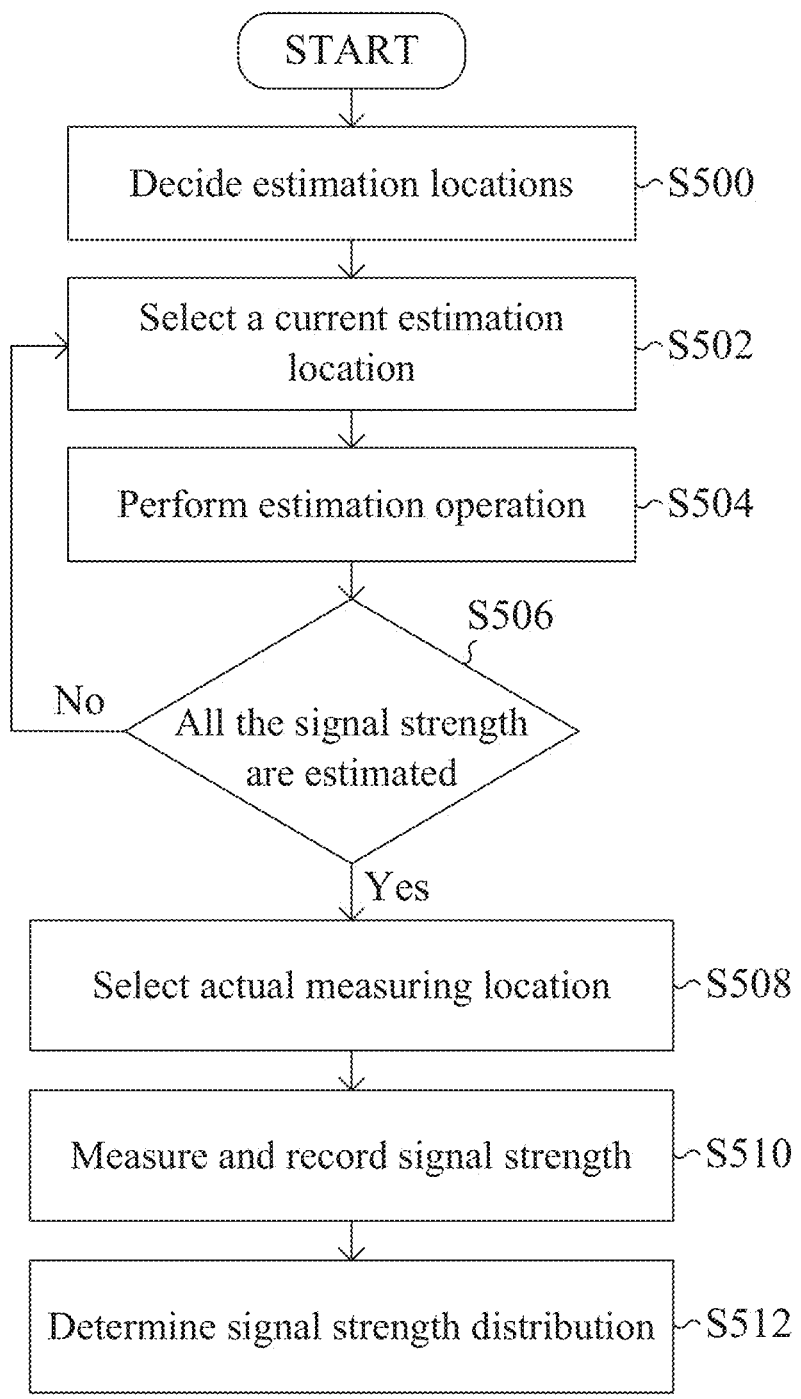
FIG. 5A is a flow chart of a method for estimating distribution of wireless signal strength in accordance with one embodiment of the present invention.

Please refer to FIG. 5A, which is a flow chart of a method for estimating distribution of wireless signal strength in accordance with one embodiment of the present invention, wherein the operations performed by the steps S500~S506 are substantially the same as those performed by the steps S200~S206 shown in FIG. 2 and therefore are not described in detail here.

As shown in FIG. 5A, after determining in the step S506 that the signal strengths in all the estimation locations are estimated, the method provided in this embodiment performs the step S508 to select some of the estimation locations as actual measuring locations in which signal strength measurement operation is going to be performed. After selecting the actual measuring locations, technicians could measure the signal strength in the positions of the specific area 10, each of which corresponds to one of the actual measuring locations, and record the measured signal strengths, which are referred to as signal measurement values hereinafter, in the step S510. After the signal measurement values of all the actual measuring locations are measured and recorded, the method provided in this embodiment could further determine the signal strength distribution within the specific area 10 in the step S512 in accordance with the estimated signal strengths of all the estimation locations and the signal measurement values of all the actual measuring locations.

It is noted that the actual measuring location refers to the estimation location meeting special conditions, that is, a signal strength measurement would be or is already performed therein. Therefore, the actual measuring location mentioned hereinafter is referred to as the estimation location in which a signal strength measurement would be or is performed.

In some embodiments, technicians could perform signal strength measurement and record the signal measurement values when some of the actual measuring locations are selected from the estimation locations, or, in other embodiments, technicians could perform signal strength measurement and record the signal measurement values after all the actual measuring locations are selected from the estimation locations. Therefore, it is not limited that the steps S508~S510 are started after completing the step S506. It is the only requirement to complete the steps S508~S510 before the signal measurement values are used in the step S512. For example, in the embodiment shown in FIG. 5B, the steps S500~S506 are performed parallelly during the time period in which the steps S508~S510 are performed, and the step S512 is performed to determine the signal strength distribution within the specific area 10 after the steps S506 and S510 are both completed.

Several embodiments performing the step S512 to select the actual measuring locations are described below.

Figure 5B:
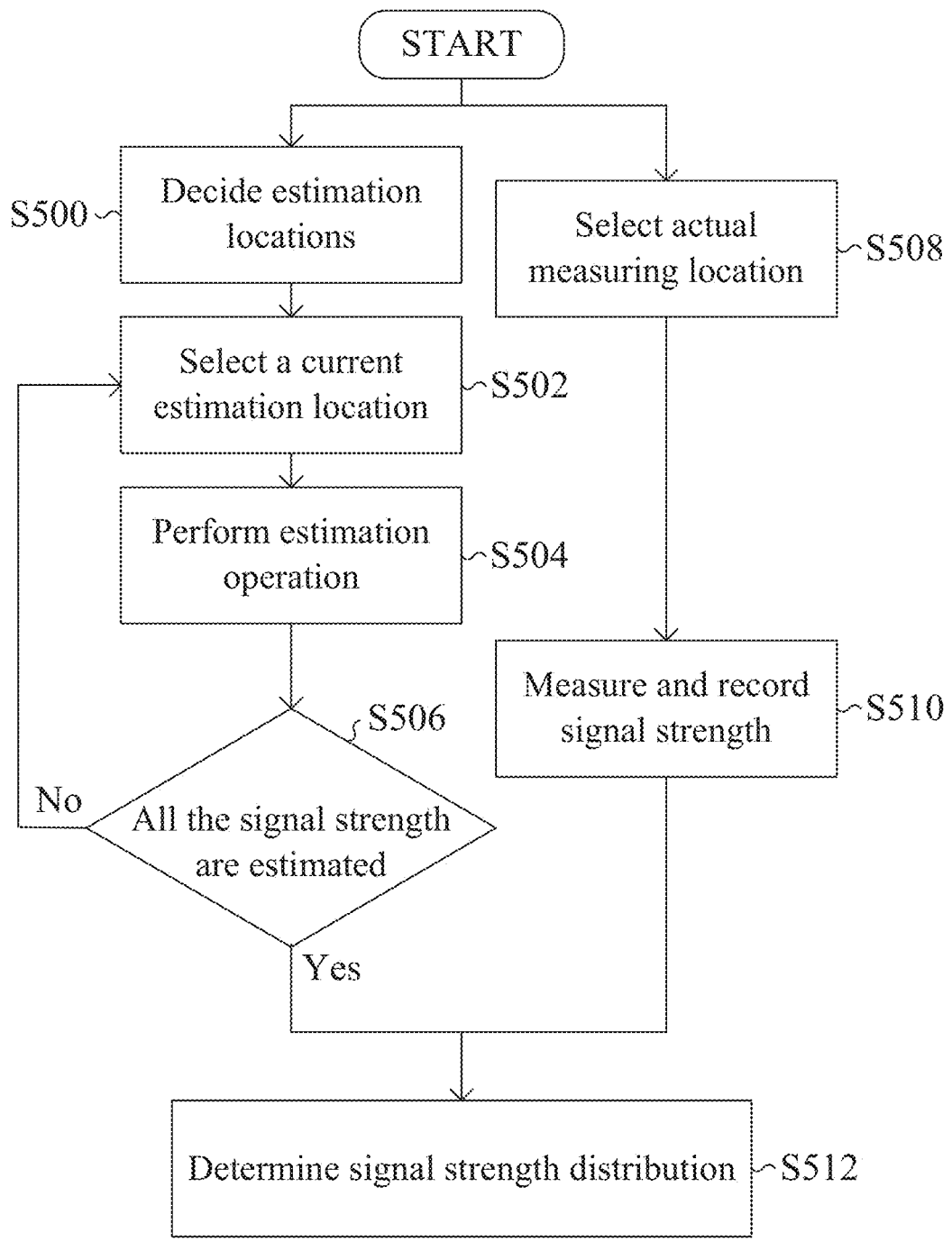
FIG. 5B is a flow chart of a method for estimating distribution of wireless signal strength in accordance with another embodiment of the present invention.
Figure 6A:
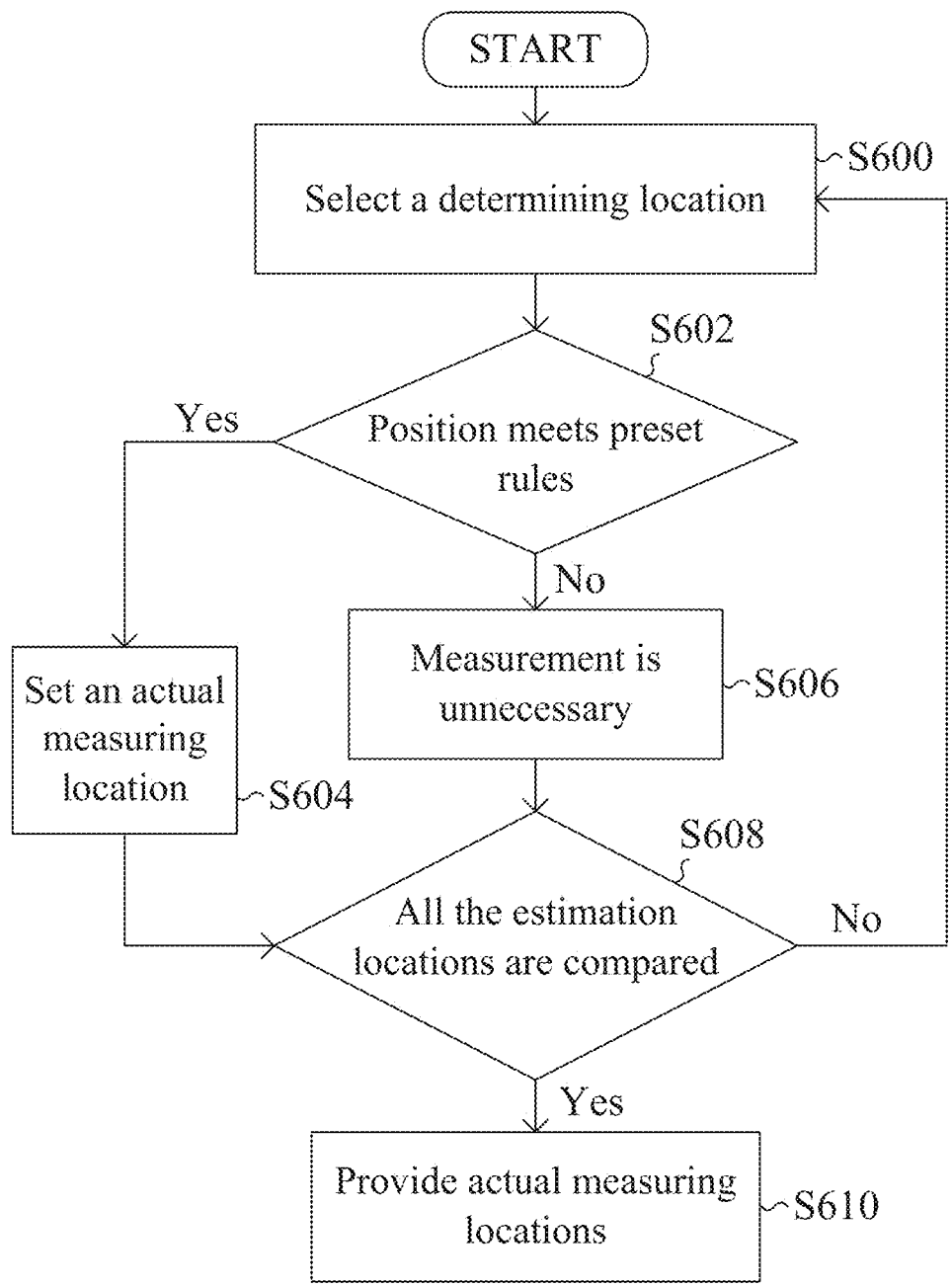
FIG. 6A is a flow chart of a method for selecting measuring locations to measure wireless signal strength in accordance with one embodiment of the present invention.

Please refer to FIG. 6A, which is a flow chart of a method for selecting measuring locations to measure wireless signal strength in accordance with one embodiment of the present invention. The method for selecting measuring locations provided in this embodiment could be a detailed procedure of the step S508 of the embodiments shown in FIG. 5A and FIG. 5B. As shown in FIG. 6A, the method provided in this embodiment selects a determining location from one of the estimation locations which have not been considered by a location selecting operation comprising the steps S602~S606 in this embodiment in the step S600. After the determining location is selected, the method for selecting measuring locations further determines whether the estimation location corresponding to the selected determining location should be set as one of the actual measuring locations in accordance with a result obtained by checking whether the position of the selected determining location is conformed to preset rules in the step S602.

In one embodiment, the planar view shown in FIG. 1 is used while checking whether the position of the selected determining location is conformed to the preset rules in the step S602. Taking the planar view shown in FIG. 1 as an example, the method for selecting measuring locations determines whether the position of the estimation location corresponding to the selected determining location is conformed to one of the following preset rules:

Preset rule one is that the position of the determining location is in one concave corner of the specific area, wherein the concave corner is referred to the position within the specific area 10 and neighboring to at least two walls. All the corners shown in FIG. 1 are the partition-wall corners 104A~104O and the outer-wall corners 106A~106D, wherein the concave corners are the lower-right side of the partition-wall corner 104A, the lower-right side of the partition-wall corner 104C, the lower-left side of the partition-wall corner 104F, the lower-right side of the partition-wall corner 104H, the upper-left side of the partition-wall corner 104J, the lower-left side of the partition-wall corner 140K, the lower-right side of the partition-wall corner 140L, the upper-right side of the partition-wall corner 140M, the upper-left side of the partition-wall corner 104O, the upper-right side of the outer-wall corner 106B and the lower-left side of the outer-wall corner 106C.

Preset rule two is that the position of the determining location is in one corner of the specific area 10 and is not neighboring to any of the estimation locations located in any concave corner of the specific area 10, wherein the corner which is not neighboring to any of the estimation locations located in any concave corner of the specific area comprises the lower-right side of the partition-wall corner 104D, the lower-left side of the partition-wall corner 104I and the upper-right side of the partition-wall corner 104L.

Preset rule three is that the position of the determining location is in front of one closed door of the specific area 10, wherein the closed doors of the specific area 10 are the doors 100A~100C and 100F.

Preset rule four is that the position of the determining location is within any passage, near any entrance of any passage or in either side of any entrance of any passage, wherein the passage of the specific area 10 is the passage 102.

Preset rule 5 is that the position of the determining location is in front of or in either side in front of one opened door of the specific area 10, wherein the opened doors are the doors 100D and 100E.

It is noted that the areas included in the dashed frames is used for marking the doors 100A~100F, the passage 102, the partition-wall corners 104A~104O and the outer-wall corners 106A~106D, and the size of each of the areas could be adjusted according to actual needs.

Figure 6B:
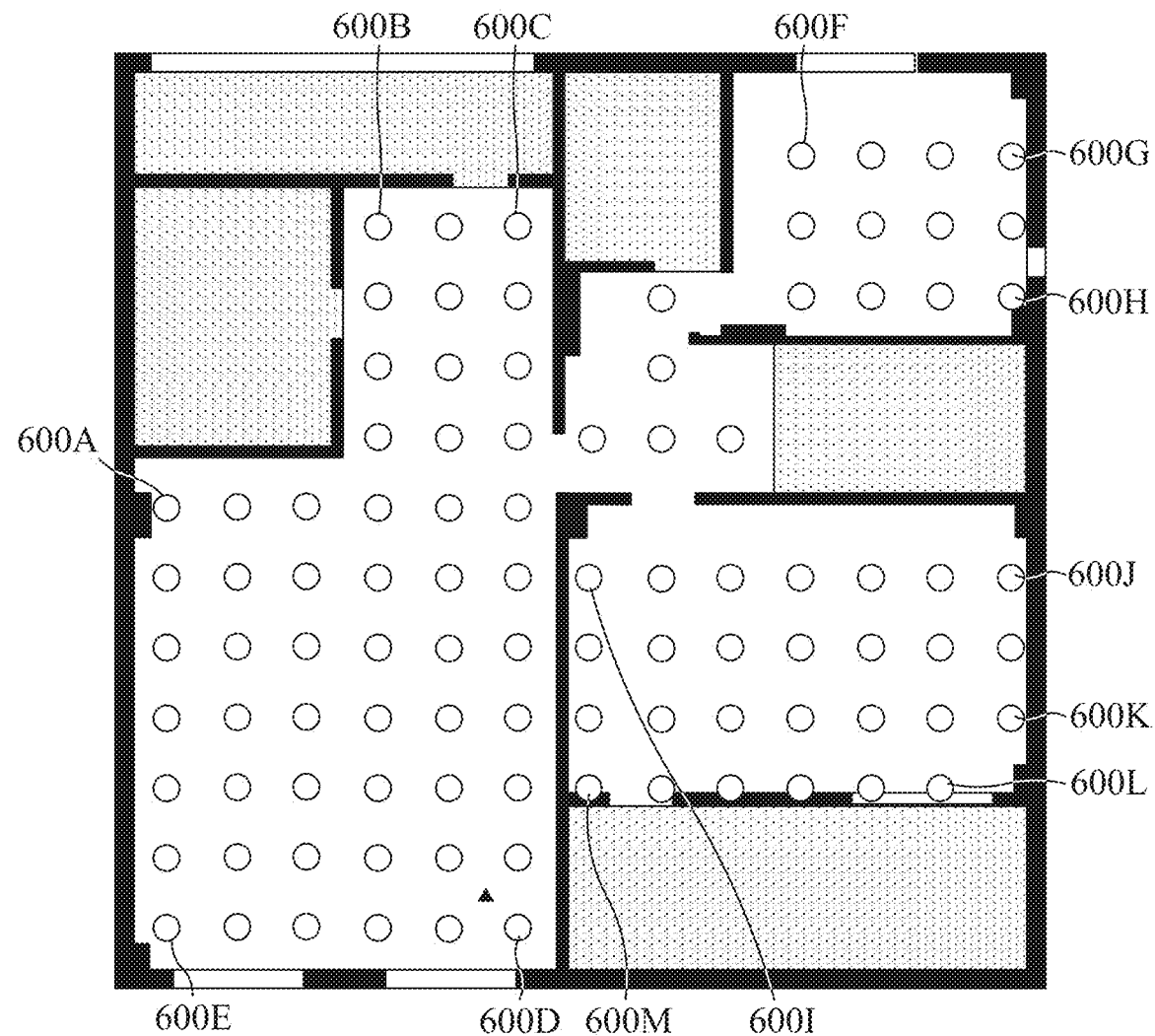
FIG. 6B is a schematic diagram shown positions of actual measuring locations selected by applying preset rule one in accordance with one embodiment of the present invention.
Figure 6C:
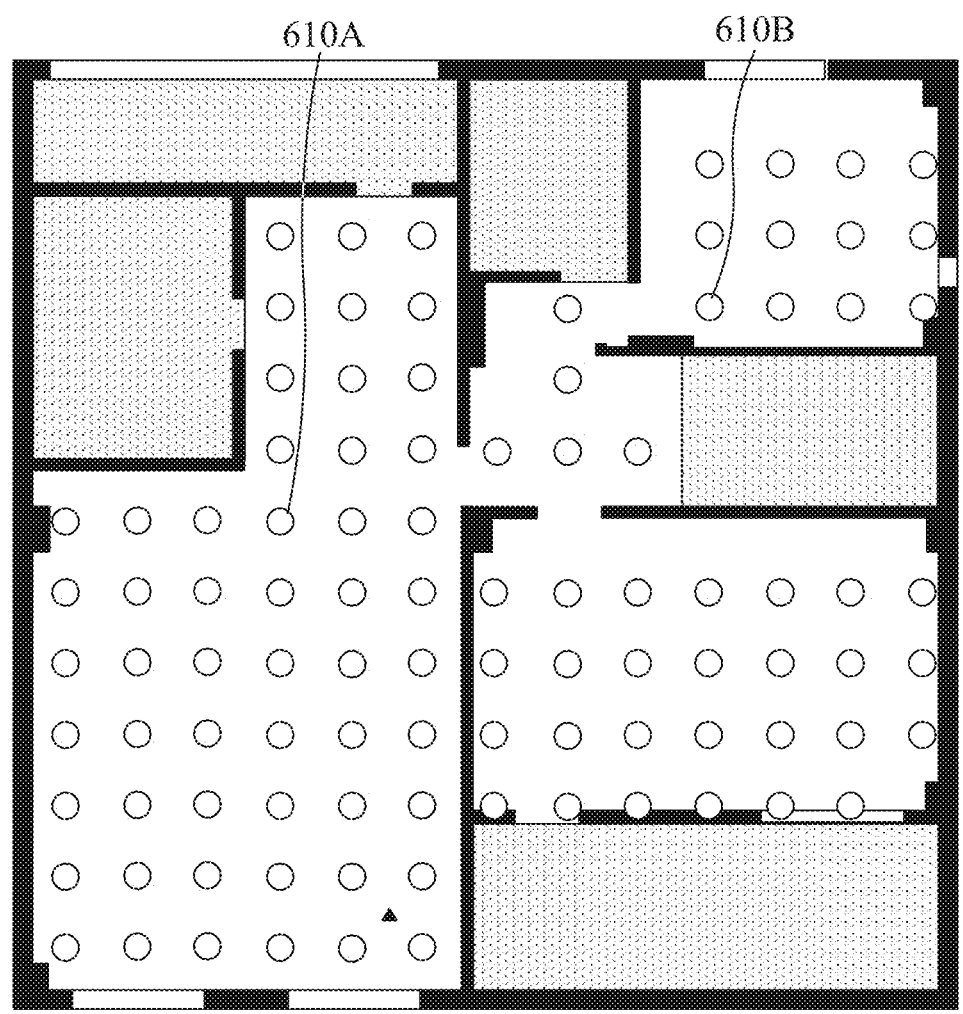
FIG. 6C is a schematic diagram shown positions of actual measuring locations selected by applying preset rule two in accordance with one embodiment of the present invention.
Figure 6D:
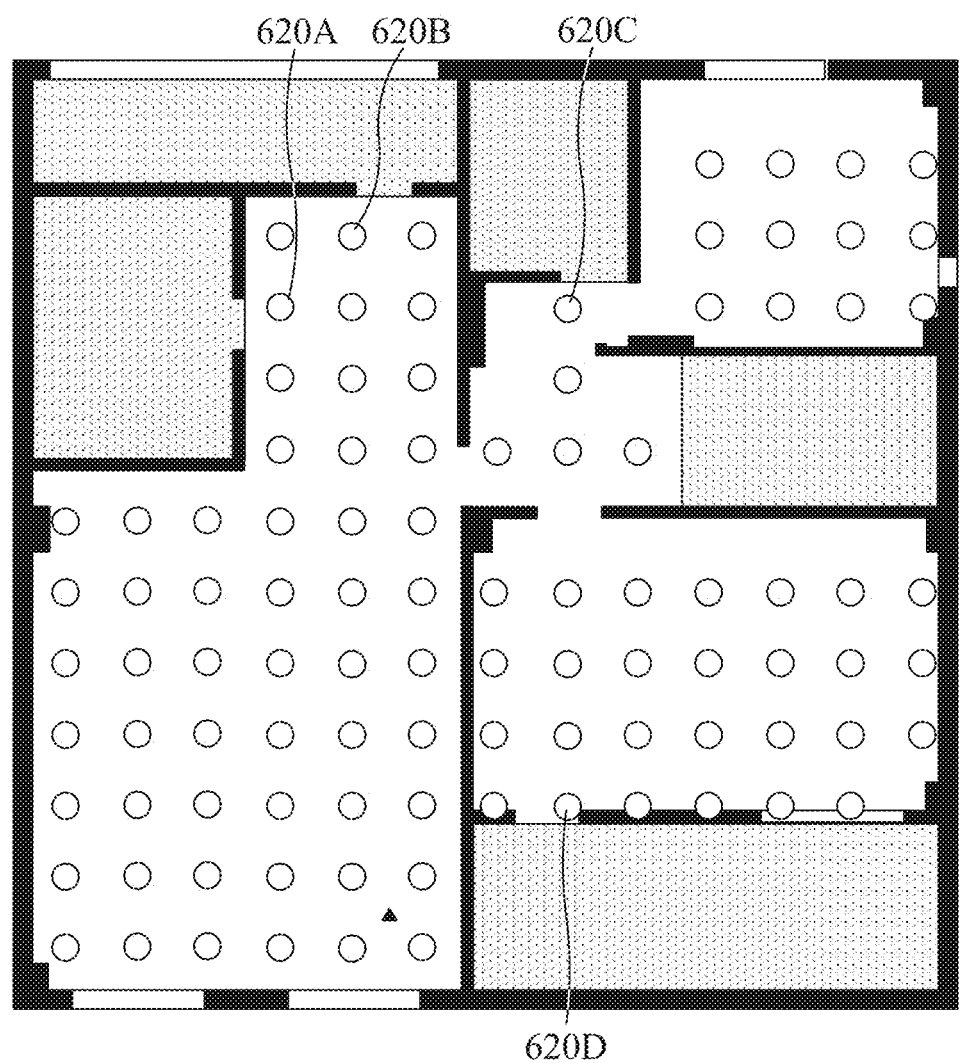
FIG. 6D is a schematic diagram shown positions of actual measuring locations selected by applying preset rule three in accordance with one embodiment of the present invention.
Figure 6E:
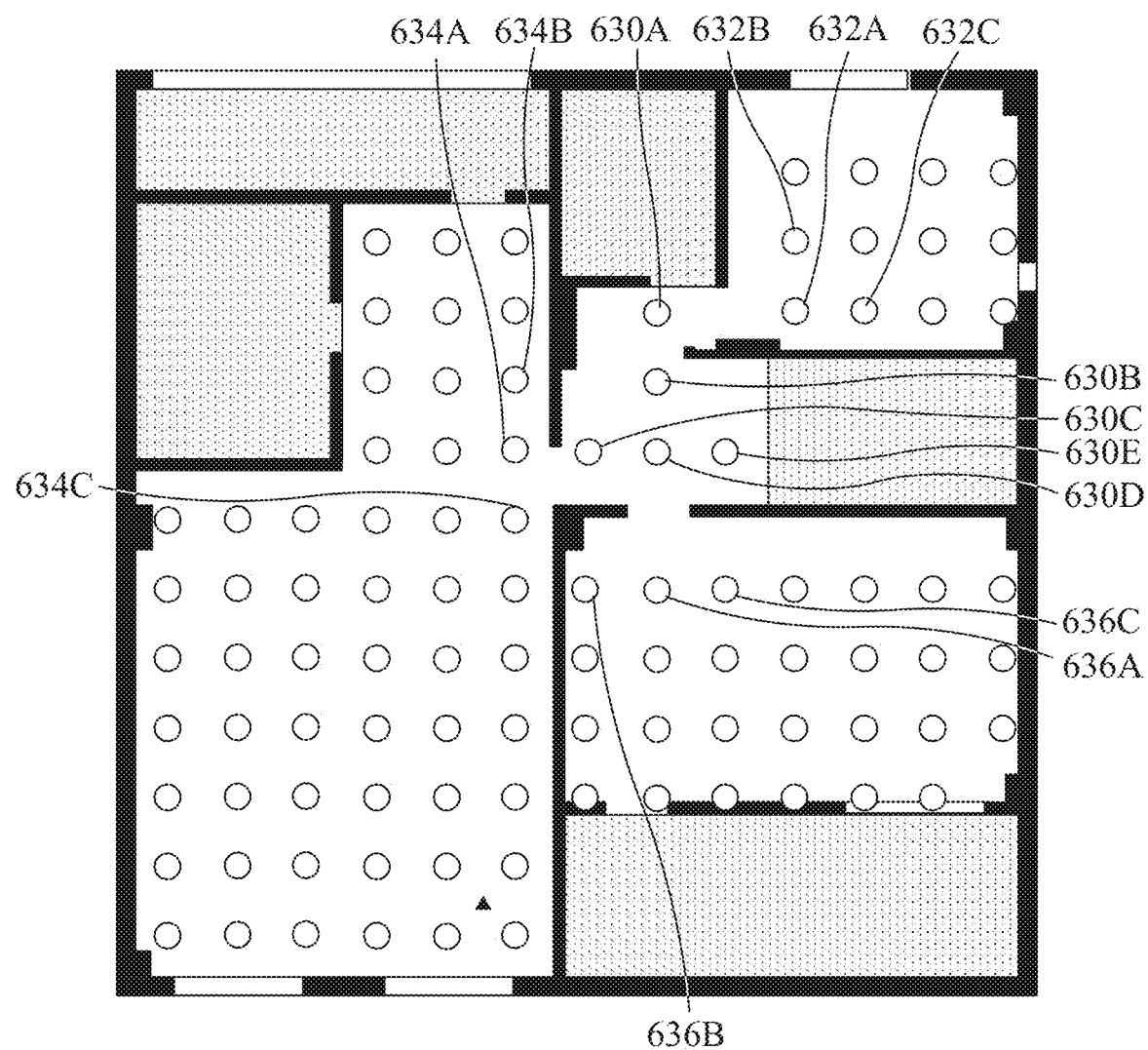
FIG. 6E is a schematic diagram shown positions of actual measuring locations selected by applying preset rule four in accordance with one embodiment of the present invention.
Figure 6F:
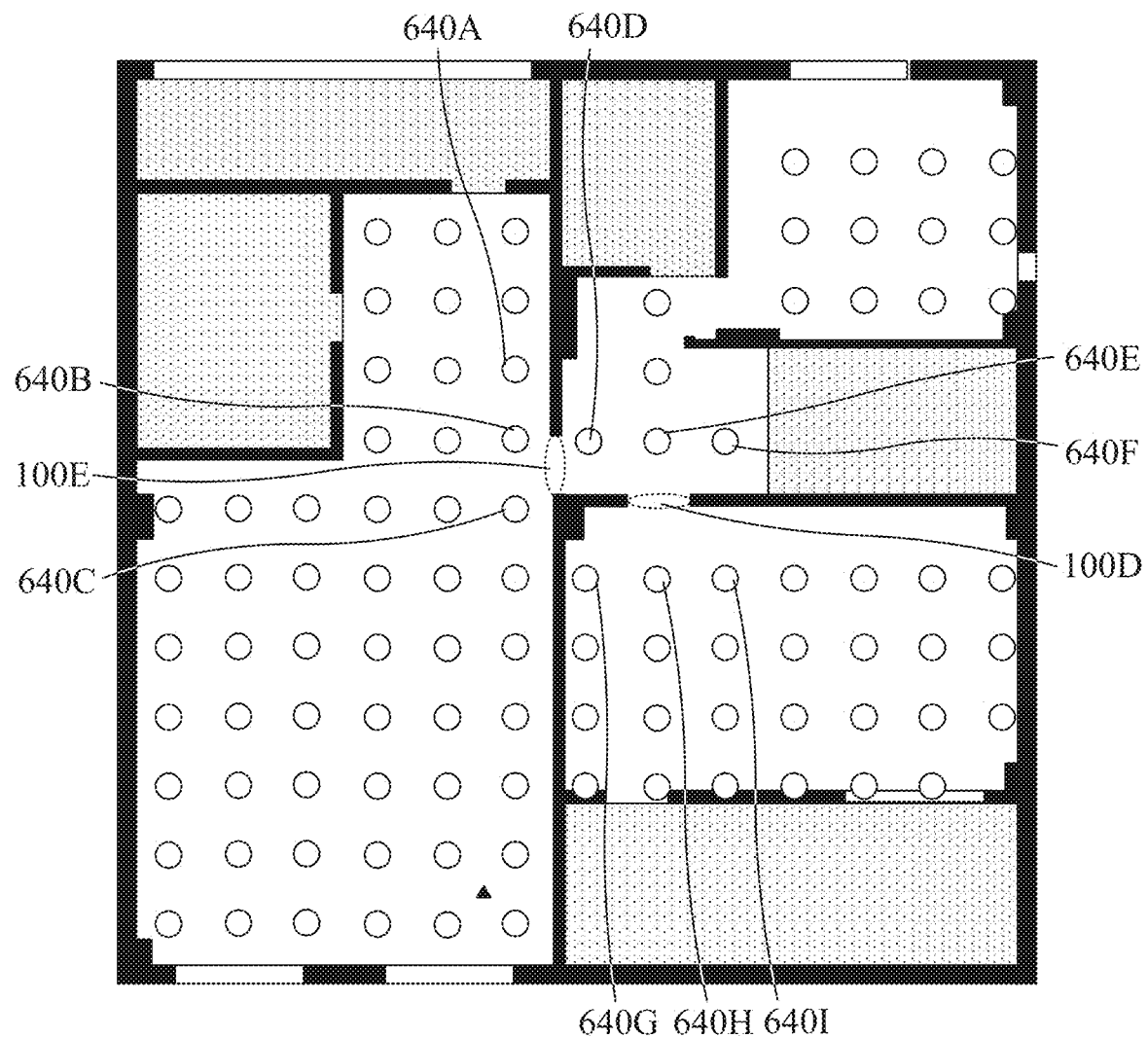
FIG. 6F is a schematic diagram shown positions of actual measuring locations selected by applying preset rule five in accordance with one embodiment of the present invention.

The estimation locations shown in FIG. 1 and conforming to the preset rule one are the estimation locations 600A~600M shown in FIG. 6B. The estimation locations shown in FIG. 1 and conforming to the preset rule two are the estimation locations 610A and 610B shown in FIG. 6C. The estimation locations shown in FIG. 1 and conforming to the preset rule three are the estimation locations 620A~620D shown in FIG. 6D. The estimation locations shown in FIG. 1 and conforming to the preset rule four are the estimation locations 630A~630E, 632A~632C, 634A~634C and 636A~636C shown in FIG. 6E, wherein the estimation locations 630A~630E are within the passage 102, the estimation locations 632A, 634A and 636A are near the entrance of the passage 102 and the estimation locations 632B~632C, 634B~634C and 636B~636C are in either side of the entrance of the passage 102. The estimation locations shown in FIG. 1 and conforming to the preset rule five are shown in FIG. 6F, wherein the estimation locations 640A~640C are either directly in front of the opened door 100E or in either side in front of the opened door 100E, and the estimation locations 640D~640I are either directly in front of the opened door 100D or in either side in front of the opened door 100D.

In this embodiment, the method for selecting measuring locations performs a determination operation for the selected determining location to determine whether the position of the selected determining location is conformed to any one of the preset rules one to five. When the position of the determining location is conformed to any one of the preset rules mentioned above, the estimation location corresponding to the determining location would be set as one of the actual measuring locations in the step S604. On the contrary, when it is determined in the step S602 that the position of the determining location is not conformed to any one of the preset rules, signal strength measuring performed in the estimation location corresponding to the determining location would be deemed unnecessary in the step S606.

After completing the step S604 or the step S606, it is determined in the step S608 that whether the location selecting operation comprising the steps S602~S606 is performed for all the estimation locations within the specific area 10. When the location selecting operation is not performed for all the estimation locations, the flow goes back to the step S600 to select another one determining location from the estimation locations which have not been considered by the determination operation. On the contrary, when the location selecting operation has been performed for all the estimation locations, the flow enters the step S610 to provide the estimation locations being set as the actual measuring locations for being used in subsequent operations. For example, the estimation locations being set as the actual measuring locations provided from the step S610 could be deemed the data generated by the step S508 such that, in the step S510, the positions in which the signal strengths are measured could be decided in accordance with the data provided by the step S508 (or step S610).

The deviations generated due to complex space circumstances while estimating the signal strength could be reduced by using the method for selecting measuring locations provided in the embodiments described above. For example, because the estimated signal strength obtained by applying the multi-ray propagation model described above might be heavily deviated from the real signal strength because the wireless signal could be reflected for many times in the corners, the deviations could be reduced by introducing the real signal strength in the corners by performing signal strength measurement in the actual measuring locations selected by the method for selecting measuring locations describe above. Furthermore, because different reflection or absorption rates might be caused by the closed door and the walls and distribution of wireless signal could be heavily affected by the opened door and passage, the real signal strength measured in these positions could also reduce the deviations generated in the actual measuring locations selected by the method for selecting measuring locations describe above.

It is noted that, according to the technique solutions provided above, technicians could increase or decrease the amount of the preset rules, adjust contents of the preset rules or change the sequences in which the preset rules are applied in accordance with actual needs. Therefore, the preset rules provided above are not limitations of the present invention.

Figure 7A:
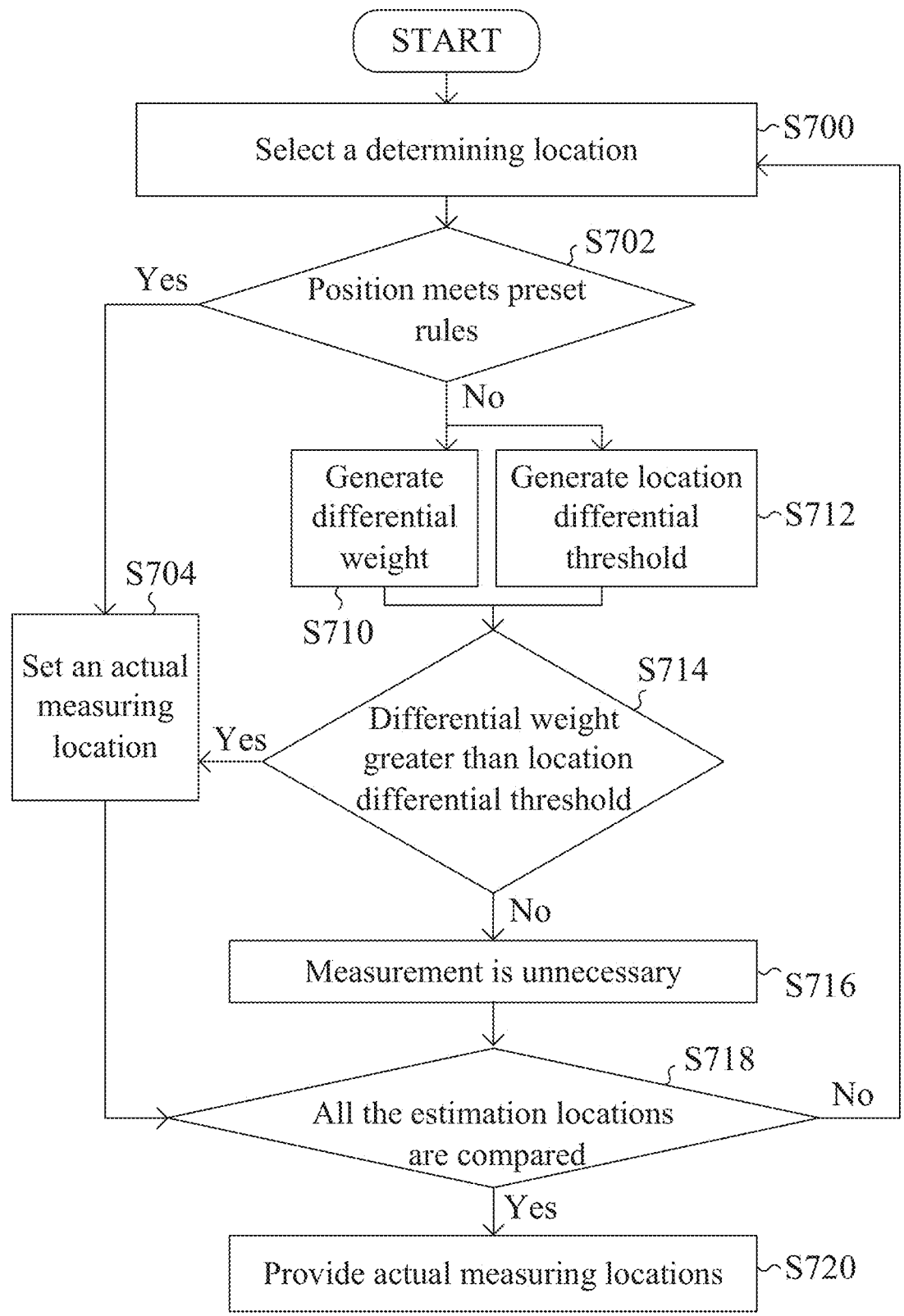
FIG. 7A is a flow chart of a method for selecting measuring locations to measure wireless signal strength in accordance with another embodiment of the present invention.

Please refer to FIG. 7A, which is a flow chart of a method for selecting measuring locations to measure wireless signal strength in accordance with another embodiment of the present invention. As shown in the figure, the method for selecting measuring locations provided in this embodiment selects one of the estimation locations as a determining location in the step S700, wherein the estimation locations under selection are the estimation locations which have not been considered by an operation determining whether the estimation locations are actual measuring locations. After selecting the determining location, it is determined in the step S702 that whether the estimation location corresponding to the determining location should be set as one of the actual measuring locations in accordance with the result obtained by checking whether the position of the determining location is conformed to the preset rules. One embodiment of the step S702 could be but not limited to the description made for FIG. 6A~FIG. 6F. It is noted that, according to the technique solutions provided above, technicians could increase or decrease the amount of the preset rules, adjust contents of the preset rules or change the sequences in which the preset rules are applied in accordance with actual needs.

When it is found in the step S702 that the position of the determining location is conformed to any one of the preset rules, the estimation location corresponding to the determining location is set as one of the actual measuring locations in the step S704. On the contrary, when it is found in the step S702 that the position of the determining location is not conformed to at least one of the preset rules, a differential weight and a location differential threshold corresponding to the determining location is generated respectively in the step S710 and the step S712. After that, a comparison result obtained by comparing the differential weight and the location differential threshold is used for determining whether the determining location could be set as one of the actual measuring locations in the step S714.

Some examples for obtaining the differential weight and the location differential threshold are described below.

Figure 8A:
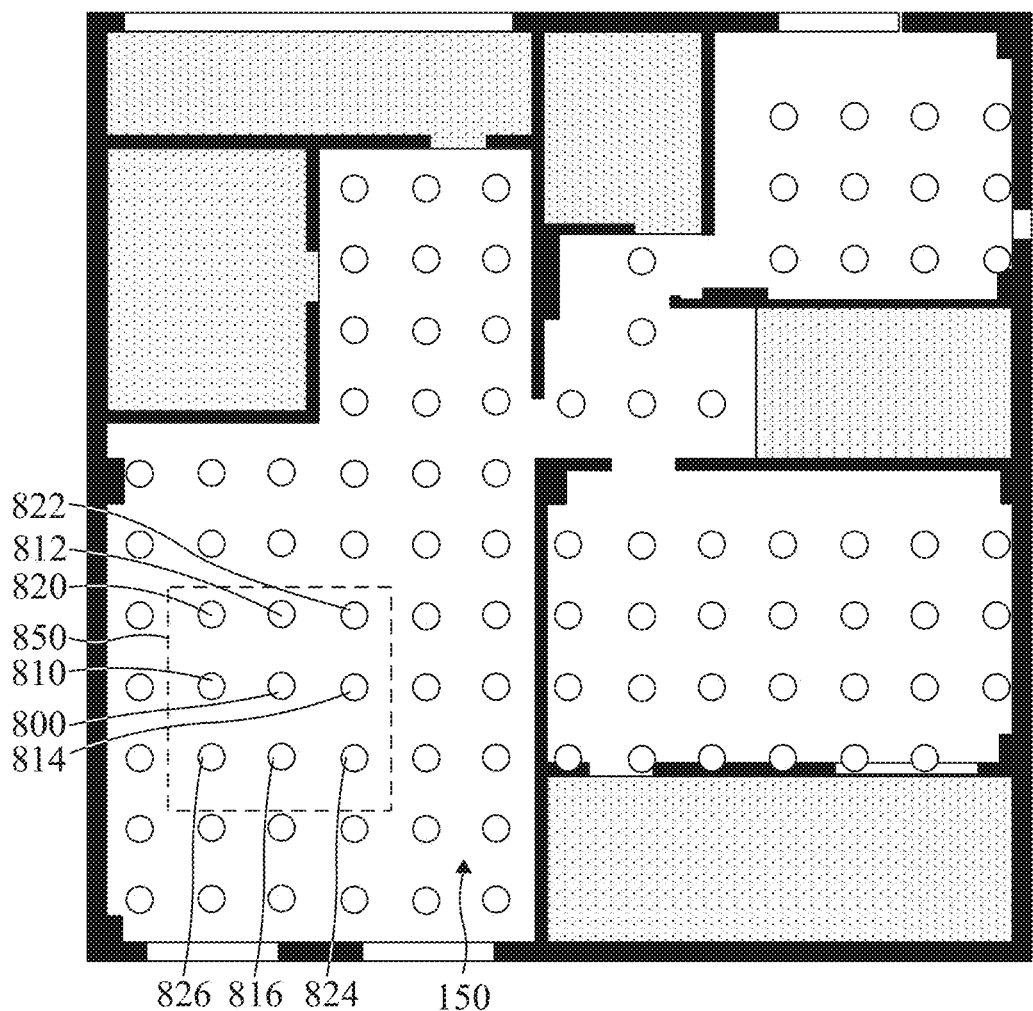
FIG. 8A is a schematic diagram shown the estimation location selected by performing the steps S710 and S712 of the embodiment shown in FIG. 7A in accordance with one embodiment of the present invention.

Please refer to FIG. 8A, which is a schematic diagram shown the estimation location selected by performing the steps S710 and S712 of the embodiment shown in FIG. 7A in accordance with one embodiment of the present invention. In this embodiment, it is assumed that the selected determining location corresponds to the estimation location 800. Because the signal strength in the estimation location 800 would be correlated with the signal strengths in the estimation locations around the estimation location 800, the estimated signal strengths in the estimation location 800 and the estimation locations around the estimation location 800 could be used for generating the differential weight corresponding to the determining location, i.e., the estimation location 800 in this embodiment, in the step S710.

Figure 7B:
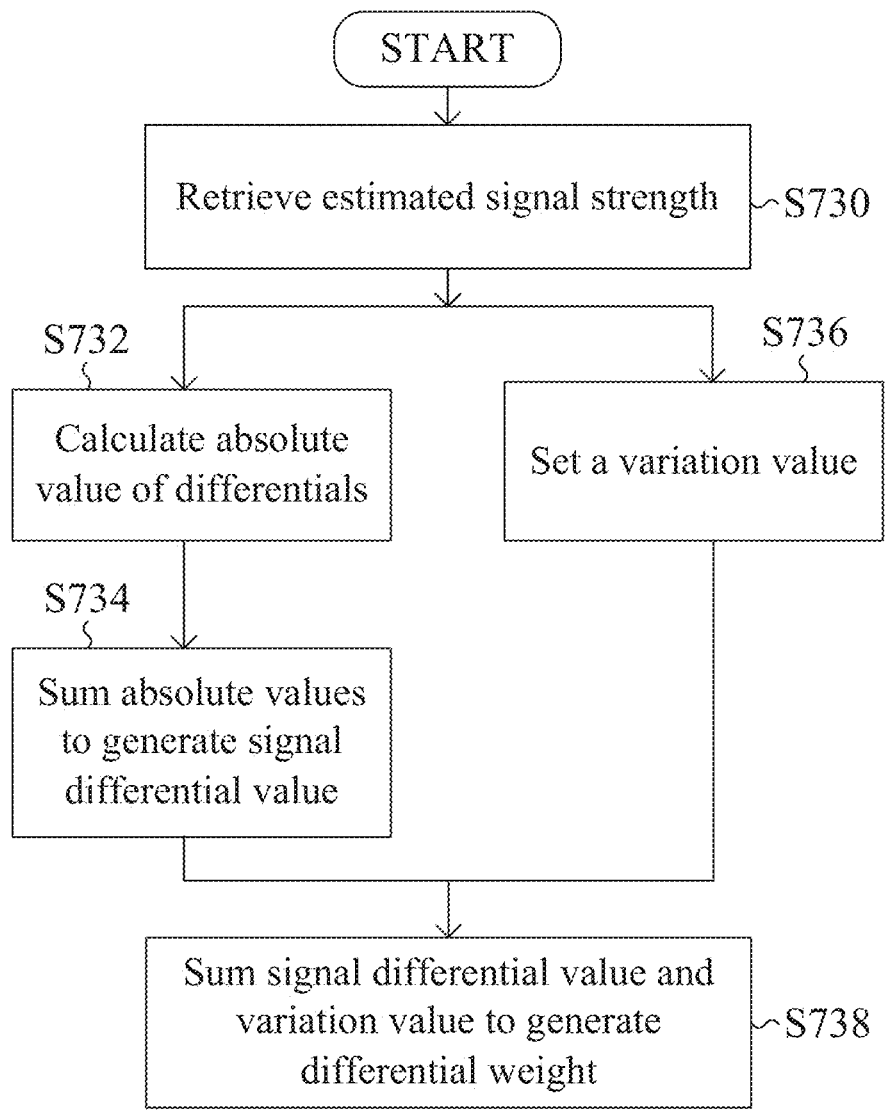
FIG. 7B is a flow chart of a method for performing the step S710 shown in FIG. 7A in accordance with one embodiment of the present invention.

Please also refer to FIG. 7B at the same time, wherein FIG. 7B is a flow chart of a method for performing the step S710 shown in FIG. 7A in accordance with one embodiment of the present invention. In this embodiment, the determining location is corresponded to the estimation location 800, and the estimated signal strengths correspond to the estimation locations within a first specific range around the determining location, that is, the estimated signal strengths of the estimation locations 800~826 within the first specific range 850 around the estimation location 800, are obtained in the step S730 firstly. After that, absolute value of differentials are obtained in the step S732. Wherein, each of the differentials is obtained from comparing a neighboring-location signal strength and a location signal strength, the neighboring-location signal strength is the estimated signal strength corresponding to a neighboring location, which is the estimation location neighboring directly to the determining location and is closer to the signal emitter 150 than the determining location is, and the location signal strength is the estimated signal strength corresponding to the determining location. Since there are two estimation locations 814 and 816 in FIG. 8A meets the definition of the neighboring location described above, the absolute value of differential obtained from comparing the neighboring-location signal strength corresponding to the neighboring location 814 and the location signal strength corresponding to the estimation location 800 and the absolute value of differential obtained from comparing the neighboring-location signal strength corresponding to the neighboring location 816 and the location signal strength corresponding to the estimation location 800 are calculated in the step S732. After that, a signal differential value is generated through the step S734 by summing all the absolute value of differentials each of which corresponds to one of the neighboring-location signal strengths and the location signal strength. For easy understanding, the absolute value of differential is also referred to as a differential component value hereinafter.

Specifically, the differential component value DA1 corresponding to the estimation locations 800 and 814 and the differential component value DA2 corresponding to the estimation locations 800 and 816 are calculated by the step S732 of this embodiment. After that, a coefficient of variation, which is also referred to as variation value hereinafter, of a set composed of all the estimated signal strengths is calculated in the step S736, wherein each of the estimated signal strengths composing the set corresponds to one of the estimation locations 800~826 within the first specific range 850 around the determining location, i.e., the estimation location 800 in this embodiment. Finally, the differential weight mentioned above is generated by summing the signal differential value and the variation value in the step S738.

It should be noted that the size of the first specific range 850 is not limited to that described in the embodiments but can be adjusted in accordance with actual needs. Furthermore, the differential component values used for calculating the signal differential value could be the values other than the estimated signal strength in the corresponded estimation locations. In different embodiments, the signal differential values could be generated by signal strength rating. For example, please refer to FIG. 8B, which is a grade table used in the step S710 of the embodiment shown in FIG. 7A in accordance with one embodiment of the present invention, the signal strength is divided into 12 strength grades and the strength grades are used to replace the estimated signal strength while generating the signal differential value.

In a specific embodiment, it is assumed that the estimated signal strengths corresponding to the estimation locations 800, 814 and 816 in FIG. 8A are −36 dbm, −33 dbm and −34 dbm in sequence, so that the strength grades 2 and 1 are selected because the estimated signal strengths −36 dbm corresponding to the estimation location 800 is included in the strength grade 2 and the estimated signal strengths −33 dbm and −34 dbm corresponding to the estimation locations 814 and 816, respectively, are included in the strength grade 1. Wherein, in order to make the description clearer, the strength grade in which the location signal strength is included is also referred to as the current strength grade hereinafter, and the strength grade in which the neighboring-location signal strength is included is also referred to as the neighbor grade hereinafter. After that, the differential component value DA1 is obtained by calculating the absolute value of the difference between the current strength grade and the neighbor grade in which the estimated signal strength corresponding to the estimation location 814 is included, and the differential component value DA2 is obtained by calculating the absolute value of the difference between the current strength grade and the neighbor grade in which the estimated signal strength corresponding to the estimation location 816 is included. Finally, the signal differential value is generated by summing the differential component values DA1 and DA2. It can be found that because either one of the two neighbor grades mentioned above is 1 while the current strength grade is 2, both the differential component value DA1 and the differential component value DA2 equal to 1 and the generated signal differential value equals to 2.

Figure 7C:
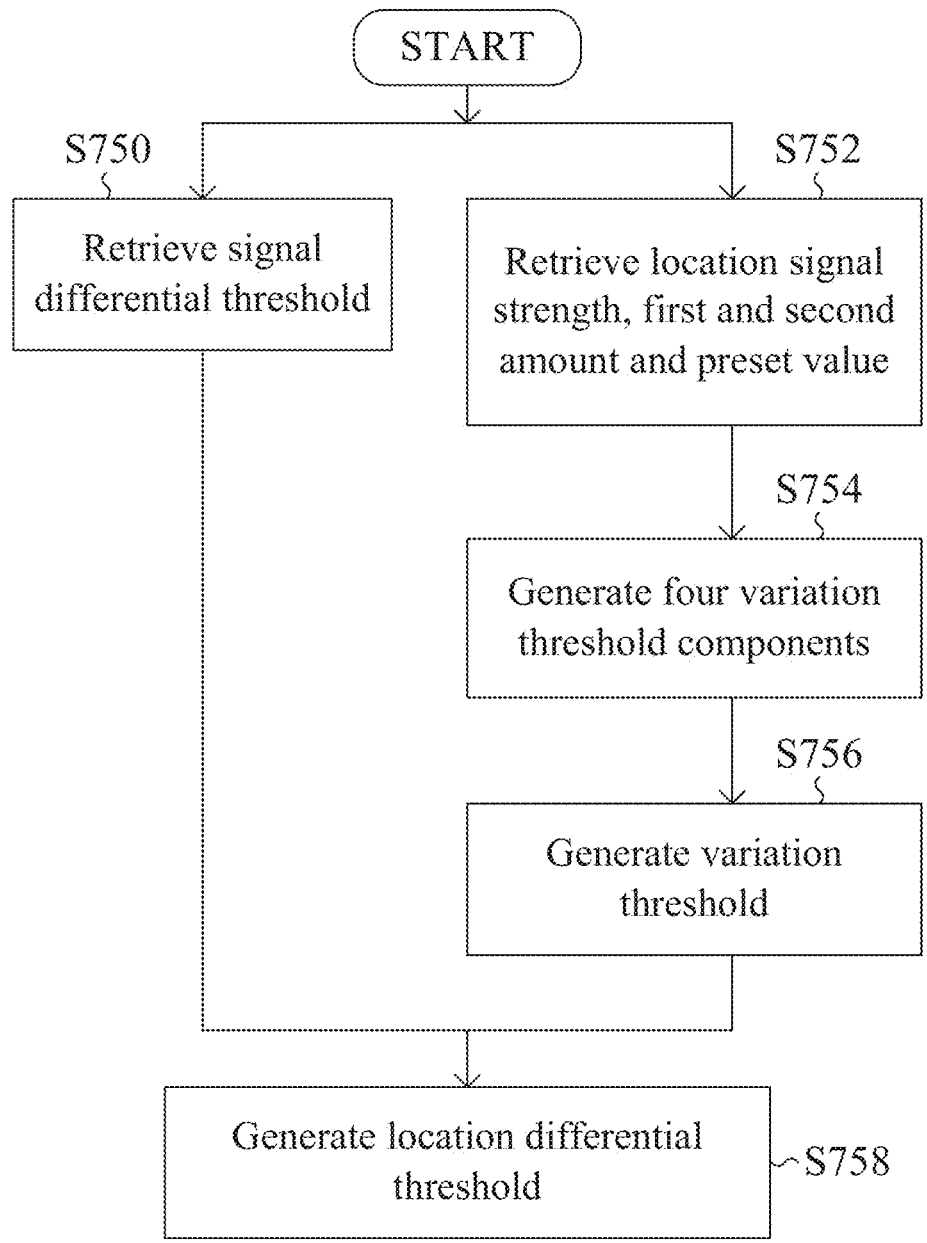
FIG. 7C is a flow chart of a method for performing the step S712 shown in FIG. 7A in accordance with one embodiment of the present invention.

Please refer to FIG. 7C and FIG. 8A, wherein the FIG. 7C is a flow chart of a method for performing the step S712 shown in FIG. 7A in accordance with one embodiment of the present invention. In this embodiment, the steps S750 and S752 could be performed parallelly such that the signal differential threshold, the location signal strength, a first amount, a second amount and a preset value could be acquired simultaneously. Wherein, summation of the first amount and the second amount equals to an amount of the estimation locations located within the first specific range 850, and the first amount is different from the second amount. Furthermore, for consistency in subsequent comparisons, when the signal differential value calculated in the steps S732~S734 is in unit of power, the signal differential threshold acquired by the step S750 should also be in unit of power such as dbm. For example, the signal differential threshold could be set to 10 dbm. On the other hand, when the signal differential value calculated in the steps S732~S734 is in unit of strength grade, the signal differential threshold acquired by the step S750 should also be in unit of strength grade, such as strength grade 2.

It is noted that, in order to meet different situations of environment, the signal differential threshold corresponding to the situation in which the determining location is within the line of sight of the signal emitter 150 could be different from the signal differential threshold corresponding to the situation in which the determining location is not within the line of sight of the signal emitter 150. For example, the signal differential threshold corresponding to the situation in which the determining location is within the line of sight of the signal emitter 150 could be set to be 10 dbm or strength grade 2 when the signal differential threshold corresponding to the situation in which the determining location is not within the line of sight of the signal emitter 150 could be set to be 5 dbm or strength grade 1.

After the location signal strength and a predetermined parameter set including the first amount, the second amount and the preset value are obtained through the step S752, a plurality of variation threshold components are calculated in the step S754 and a variation threshold is generated by averaging the variation threshold components in the step S756. Several embodiments used for explaining how the variation threshold components are calculated are described below, wherein the preset value is set to be 5 dbm and the first amount is set to be 5 while setting the second amount to be 4 in this embodiment since the amount of the estimation locations within the first specific range 850 is 9 and the first amount must be different from the second amount. It should be noted that the first amount, the second amount and the preset value listed above are for purpose of illustrating and description only but not limitations of the present invention.

The first way to generate one of the variation threshold components is to build a first data set which includes the first amount of first data and the second amount of second data, wherein each of the first data is the location signal strength and each of the second data is the location signal strength plus the preset value. In one embodiment in which the first amount is 5, the second amount is 4, the preset value is 5 dbm and the location signal strength is −36 dbm, the first data set would comprise five first data and four second data, wherein each of the first data is −36 dbm and each of the second data is −31 dbm. After the first data set is built, the coefficient of variation of the first data set is calculated and output as a first variation threshold component.

The second way to generate one of the variation threshold components is to build a second data set which includes the first amount of the first data and the second amount of third data, wherein each of the first data is the location signal strength and each of the third data is the location signal strength minus the preset value. In the same embodiment as above, the second data set would comprise five first data and four third data, wherein each of the first data is −36 dbm and each of the third data is −41 dbm. After the second data set is built, the coefficient of variation of the second data set is calculated and output as a second variation threshold component.

The third way to generate one of the variation threshold components is to build a third data set which includes the second amount of the first data and the first amount of the second data, wherein each of the first data is the location signal strength and each of the second data is the location signal strength plus the preset value. In the same embodiment as above, the third data set would comprise four first data and five second data, wherein each of the first data is −36 dbm and each of the third data is −31 dbm. After the third data set is built, the coefficient of variation of the third data set is calculated and output as a third variation threshold component.

The fourth way to generate one of the variation threshold components is to build a fourth data set which includes the second amount of the first data and the first amount of the third data, wherein each of the first data is the location signal strength and each of the third data is the location signal strength minus the preset value. In the same embodiment as above, the fourth data set would comprise four first data and five third data, wherein each of the first data is −36 dbm and each of the third data is −41 dbm. After the fourth data set is built, the coefficient of variation of the fourth data set is calculated and output as a fourth variation threshold component.

In this embodiment, the four variation threshold components could be generated through the four ways described above and the variation threshold is generated by averaging the four variation threshold components.

In this embodiment, after generating the signal differential threshold and the variation threshold through the steps S750 and S756 described above, the location differential threshold could be generated by adding the signal differential threshold and the variation threshold in the step S758.

Refer bac to FIG. 7A. With the embodiments and the descriptions relating to FIG. 7B, FIG. 7C, FIG. 8A and FIG. 8B, the differential weight and the location differential threshold can be generated through the step S710 and the step S712 of the present invention, respectively. After generating the differential weight and the location differential threshold, the differential weight and the location differential threshold are compared in the step S714. When the differential weight is greater than the location differential threshold, the flow enters the step S704 to set the estimation location corresponding to the determining location as one of the actual measuring locations. On the contrary, when the differential weight is not greater than the location differential threshold, the flow enters the step S716, and it is deemed unnecessary to perform signal strength measuring performed in the estimation location corresponding to the determining location. After completing the step S704 or the step S716, it is determined in step S718 whether the location selecting operation including the steps S702~S716 is performed to consider all the estimation locations within the specific area 10. When at least one of the estimation locations has not been considered by the location selecting operation, the flow goes back to the step S700 to newly select a determining location from one of the estimation locations which have not been considered by the operation which determines whether the estimation location is one of the actual measuring locations. On the contrary, when all the estimation locations are considered by the location selecting operation, the flow goes into the step S720 to provide the estimation locations being set as the actual measuring locations for being used in subsequent operations.

Please refer to FIG. 5A and FIG. 5B again. In these two embodiments, the actual measuring locations could be decided by the above-described operations or other operations in the step S508. After that, the signal strength measurement operation is performed in the actual measuring locations and the signal measurement values obtained by the signal strength measurement operation are recorded in the step S510 in both the two embodiments. The process comprising performing the signal strength measurement operation and recording the signal measurement values is referred to as a signal renew operation hereinafter.

Figure 9:
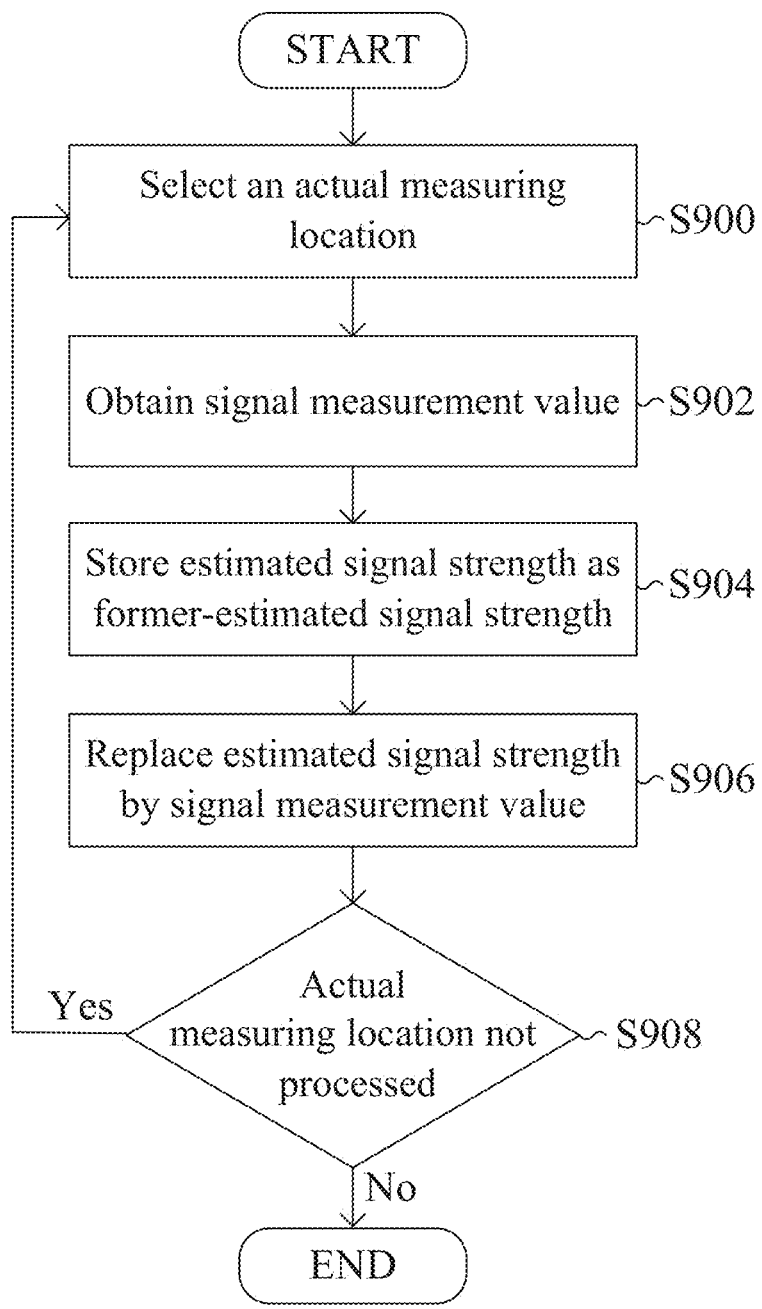
FIG. 9 is a flow chart of a signal renew operation in accordance with one embodiment of the present invention.

Please refer to FIG. 9, which is a flow chart of a signal renew operation in accordance with one embodiment of the present invention. As shown in the figure, one of the actual measuring locations in which the signal strength measurement operation has not been performed is selected in the step S900, and then the signal strength measurement operation is performed in the selected actual measuring location and the signal measurement value corresponding to the selected actual measuring location is obtained accordingly in the step S902. After obtaining the signal measurement value, the estimated signal strength corresponding to the selected actual measuring location is stored as a former-estimated signal strength corresponding to the selected actual measuring location in the step S904. It is noted that since the selected actual measuring location is also one of the estimation locations, the former-estimated signal strength corresponding to the selected actual measuring location is also the former-estimated signal strength corresponding to the estimation location to which the selected actual measuring location is corresponded. After completing the step S904, the estimated signal strength corresponding to the selected actual measuring location is replaced by the signal measurement value obtained from the step S902 in the step S906. After completing the step S906, it is determined that whether the signal strength measurement operation has not been performed in any one of the actual measuring locations in the step S908. When the signal strength measurement operation has not been performed in at least one of the actual measuring locations, the flow goes back to the step S900 to select another actual measuring location and the operations described above are repeated for dealing with the newly selected actual measuring location. On the contrary, the signal renew operation provided in this embodiment would be closed once the signal strength measurement operation has been performed in all the actual measuring location.

After performing the operations described in the above embodiment, the signal strength distribution within the specific area 10 can be determined or even drawn in accordance with the existing estimated signal strengths in the step S512 in both two embodiments shown in FIG. 5A and FIG. 5B.

Figure 10:
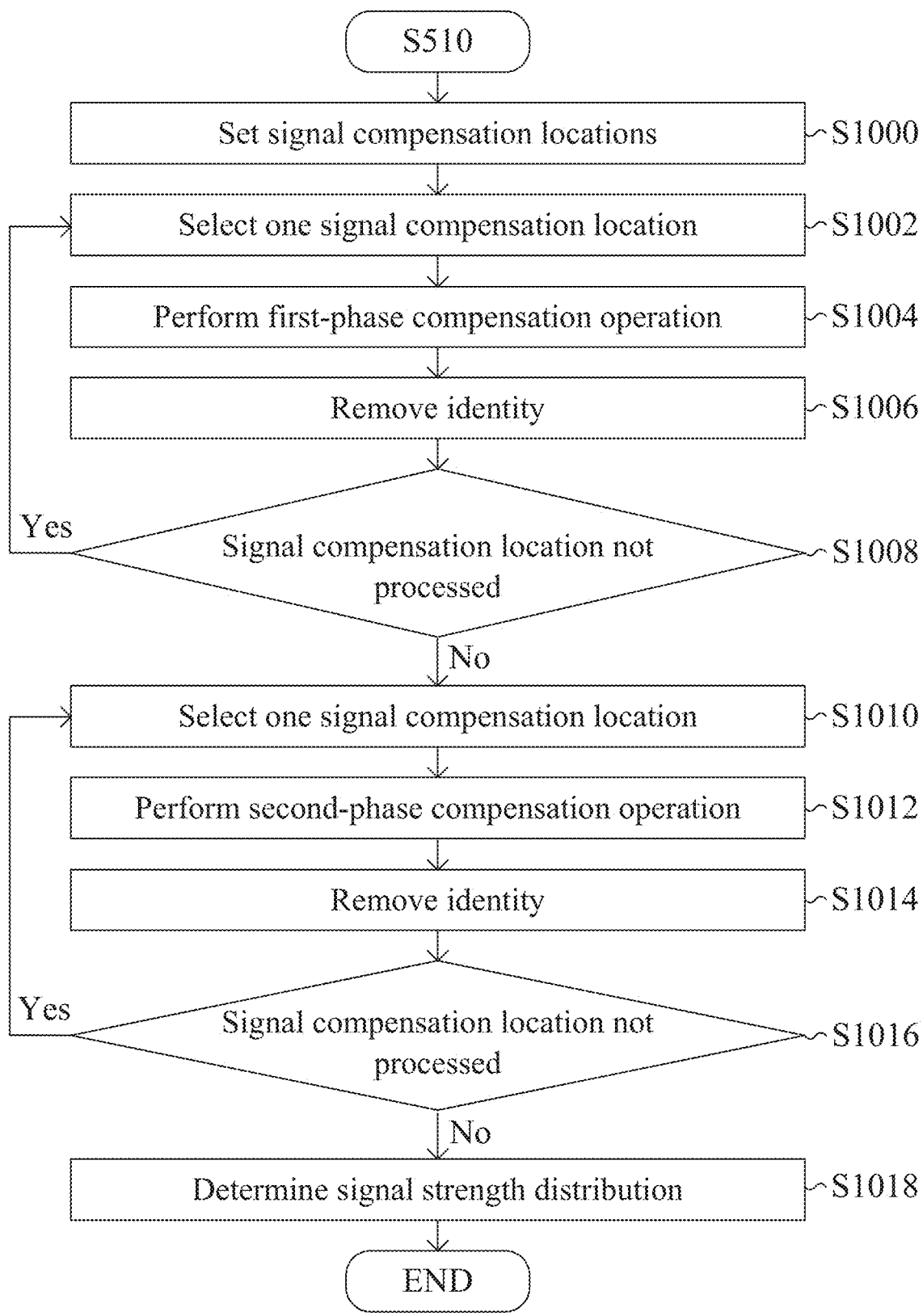
FIG. 10 is a flow chart of a method for estimating distribution of wireless signal strength in accordance with another embodiment of the present invention.

Furthermore, the estimated signal strengths corresponding to the estimation locations could be fine-tuned in accordance with the signal measurement values measured in the actual measuring locations in the method for estimating distribution of wireless signal strength provided by the present invention. Please refer to FIG. 10, which is a flow chart of a method for estimating distribution of wireless signal strength in accordance with another embodiment of the present invention. In order to simplify the drawings, only the steps after the step S510 are shown in FIG. 10. The descriptions of the step S510 and the steps before the step S510 can be found in the embodiments described above and are not repeated here.

As shown in FIG. 10, after recording the signal measurement values in the step S510, the estimation locations without corresponded former-estimated signal strengths are set to be signal compensation locations corresponded thereto in the step S1000. It is noted that the signal compensation location is an estimation location in which an operation for compensating signal strength is or will be performed. Therefore, when the signal compensation location is mentioned hereinafter, it refers to the estimation location corresponding to the mentioned signal compensation location in which the operation for compensating signal strength is or will be performed.

After the operation for setting the signal compensation locations is completed, one of the signal compensation locations is selected in accordance with a specific condition in the step S1002. A first-phase compensation operation is performed for the selected signal compensation location, or, in other words, the selected signal compensation location is processed by the first-phase compensation operation, in the step S1004 such that the estimated signal strength of the signal compensation location is compensated. After completing the first-phase compensation operation performed for the selected signal compensation location, identity representing the selected signal compensation location is removed in the step S1006 such that the estimation location corresponded thereto is no longer one of the signal compensation locations.

After completing the step S1006, the signal compensation locations are checked to determine whether there exists at least one signal compensation location which is conformed to the specific condition but not processed by the first-phase compensation operation yet in the step S1008. When there exists at least one signal compensation location which is conformed to the specific condition but not processed by the first-phase compensation operation, the flow goes back to and perform the step S1002. On the contrary, when all the signal compensation locations conformed to the specific condition have been processed by the first-phase compensation operation, one of the signal compensation locations which are suitable for being processed by a second-phase compensation operation is selected in the step S1010, wherein the technique solutions about how the signal compensation location suitable for being processed by the second-phase compensation operation is selected will be described in the descriptions made later. After the signal compensation location suitable for being processed by the second-phase compensation operation is selected, the second-phase compensation operation is performed for the selected signal compensation location to compensate the estimated signal strength corresponding to the selected signal compensation location in the step S1012. After the selected compensation location has been processed by the second-phase compensation operation in the step S1012, identity representing the selected signal compensation location is removed in the step S1014 such that the estimation location corresponded thereto is no longer one of the signal compensation locations.

After completing the step S1014, the signal compensation locations are checked to determine whether there exists at least one signal compensation location in the step S1016. When there exists at least one signal compensation location, the flow goes back to and perform the step S1010. On the contrary, when there is no any signal compensation location left, that is, each of the signal compensation locations set in the step S1000 is processed by either the first-phase compensation operation or the second-phase compensation operation, the flow enters the step S1018 to determine the signal strength distribution within the specific area 10 in accordance with the estimated signal strengths corresponding to all the estimation locations.

For the convenience of description, the steps S1000~S1016 shown in FIG. 10 are collectively referred to as the method for compensating estimated wireless signal strength and are described in detail with the accompanying drawings.

Figure 11A:
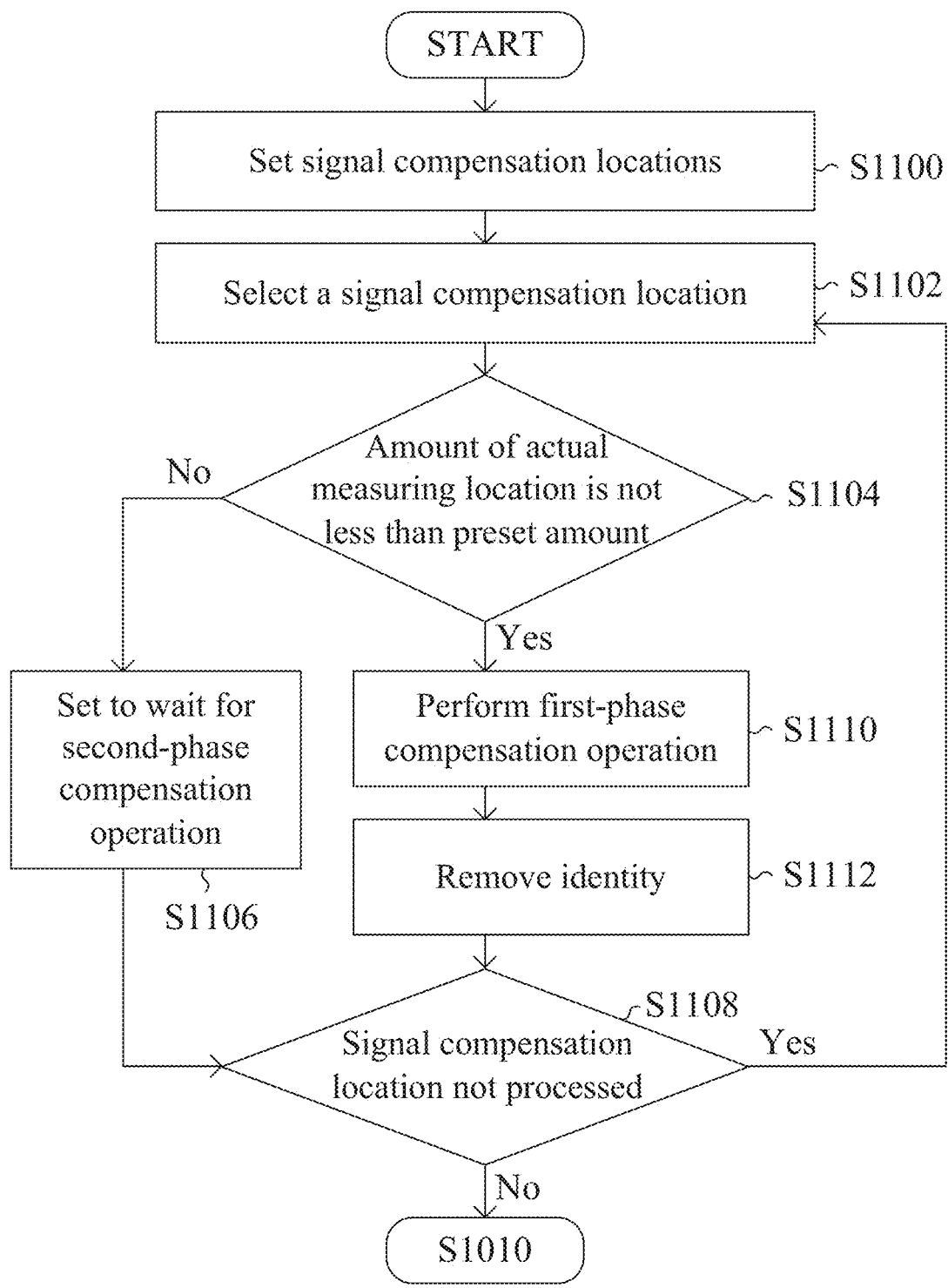
FIG. 11A is a flow chart shown detailed operation of the steps S1000~S1008 performed by a method for compensating estimated wireless signal strength in accordance with one embodiment of the present invention.

Please refer to FIG. 11A, which is a flow chart shown detailed operation of the steps S1000~S1008 performed by a method for compensating estimated wireless signal strength in accordance with one embodiment of the present invention. In this embodiment, each of the estimation locations which is not with a corresponded actual measuring locations selected before is set to be one of the signal compensation locations in the step S1100. As known from the embodiments described above, the actual measuring locations selected before should be with corresponded estimated signal strength and corresponded former-estimated signal strength. Therefore, it is possible to determine whether an estimation location is also an actual measuring location selected before by checking whether the estimation location is with a corresponded former-estimated signal strength. In another embodiment, it is possible to set a flag to the estimation location when the estimation location is selected to be an actual measuring location so that whether the estimation location is an actual measuring location selected before could be determined by checking existence of the flag.

After setting the signal compensation locations in the step S1100, one of the signal compensation locations have not been processed by the operations performed by the steps following the step S1102 is selected in the step S1102. After selection, whether an amount of the actual measuring location within a second specific range around the selected signal compensation location is not less than a first preset amount is determined in the step S1104, and, when the amount of the actual measuring location within the specific range around the selected signal compensation location is no less than the first preset amount, the first-phase compensation operation is performed for the selected signal compensation location in the step S1110. In other words, the specific condition mentioned in the step S1002 is the determining condition used in the step S1104. Therefore, in order to satisfy the specific condition in this embodiment, the amount of the actual measuring locations within the second specific range around the selected signal compensation location should be not less than the first preset amount. More detailed descriptions are made below with FIG. 12A.

Figure 12A:
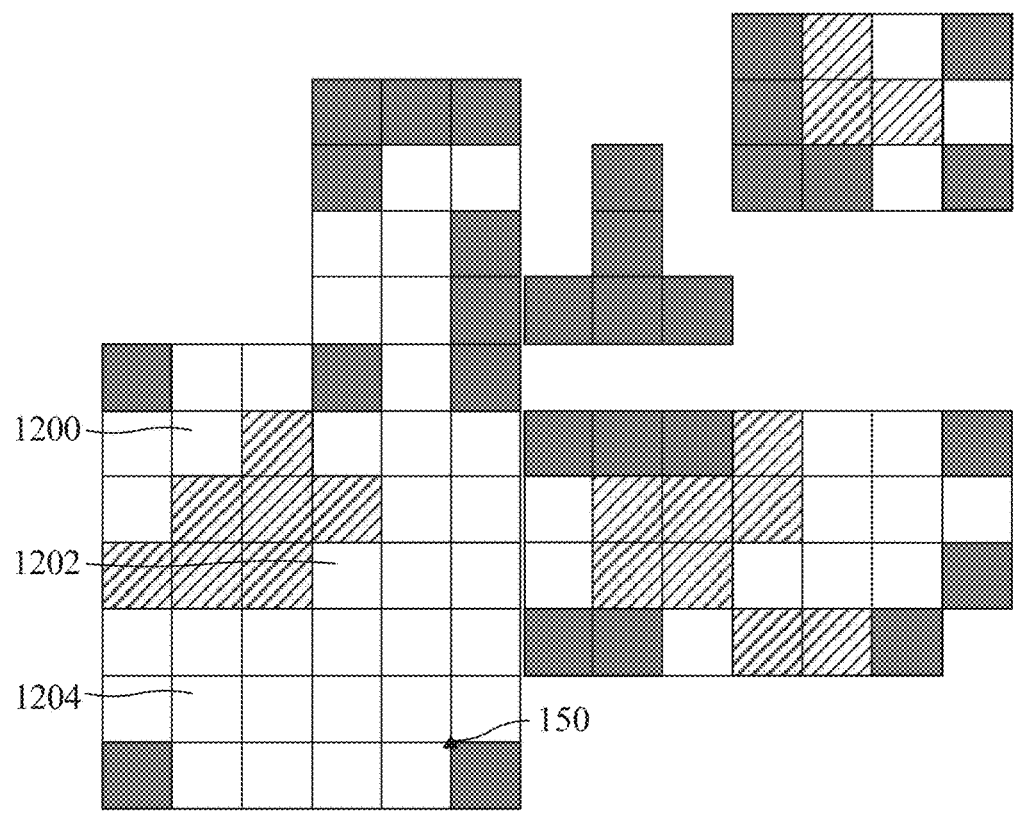
FIG. 12A is a schematic diagram shown distribution of actual measuring locations in accordance with one embodiment of the present invention.

Please refer to FIG. 12A, which is a schematic diagram shown distribution of actual measuring locations in accordance with one embodiment of the present invention. Wherein, each rectangular frame represents an estimation location shown in FIG. 1, the actual measuring locations obtained in accordance with the positions of the estimation locations and the descriptions relating to FIG. 6A~FIG. 6F are represented by rectangular frames filled with shadows, and the actual measuring locations obtained in accordance with the estimated signal strengths corresponding to the neighbored estimation locations and the descriptions relating to FIG. 7A~FIG. 7C are represented by rectangular frames filled with slashes.

In this embodiment, the first preset amount is set to be 2, the second specific range is the area which covers a 3*3 matrix centered at the signal compensation location and is similar to that shown in FIG. 8A. As shown in FIG. 12A, when the selected signal compensation location is the signal compensation location 1200, it is found that the amount of the actual measuring locations is greater than the first preset amount so that the specific condition defined in the step S1104 is satisfied and the first-phase compensation operation could be performed for the signal compensation location 1200, wherein, there are four actual measuring locations around the signal compensation location 1200, and the four actual measuring locations are located in the positions in upper-left side, right side, lower-right side and lower side of the signal compensation location 1200, respectively. Similarly, when the selected signal compensation location is the signal compensation location 1202, it is found that the amount of the actual measuring locations is greater than the first preset amount so that the specific condition defined in the step S1104 is also satisfied and the first-phase compensation operation could also be performed for the signal compensation location 1202, wherein, there are three actual measuring locations around the signal compensation location 1202, and the three actual measuring locations are located in the positions in upper side, upper-left side and left side of the signal compensation location 1202, respectively. On the contrary, when the selected signal compensation location is the signal compensation location 1204, it is found that the amount of the actual measuring locations is small than the first preset amount so that the specific condition defined in the step S1104 is not satisfied and the first-phase compensation operation should not be performed for the signal compensation location 1204, wherein, there is only one actual measuring location around the signal compensation location 1204, and the only one actual measuring location is located in the position in lower-left side of the signal compensation location 1204.

Accordingly, after performing the determination made by the step S1104, it is determined that the signal compensation locations 1200 and 1202 could be processed by the first-phase compensation operation in the step S1110. Furthermore, after the first-phase compensation operation is performed for the signal compensation locations 1200 and 1202, respectively, identities representing the signal compensation locations 1200 and 1202 are removed such that the estimation locations corresponding to the signal compensation locations 1200 and 1202 would not be processed by any operations performed to compensate signal strengths thereof. On the contrary, after performing the determination made by the step S1104, it is determined that the signal compensation location 1204 should not be processed by the first-phase compensation operation in the step S1110. Therefore, in the step S1106, the signal compensation location 1204 is classified into the group in which the signal compensation locations are prepared to be processed by the second-phase compensation operation.

After completing the step S1106 or the step S1112, the flow goes to the step S1108 to determine whether there exists at least one signal compensation location which has not been selected by the step S1102. When there exists at least one signal compensation location which has not been selected by the step S1102, the flow goes back to the step S1102 to select another signal compensation location, and operations following the step S1102 are performed again in the way described above. On the contrary, when all the signal compensation locations are ever selected by the step S1102, the flow goes to the step S1010 to perform the subsequent operations.

Figure 11B:
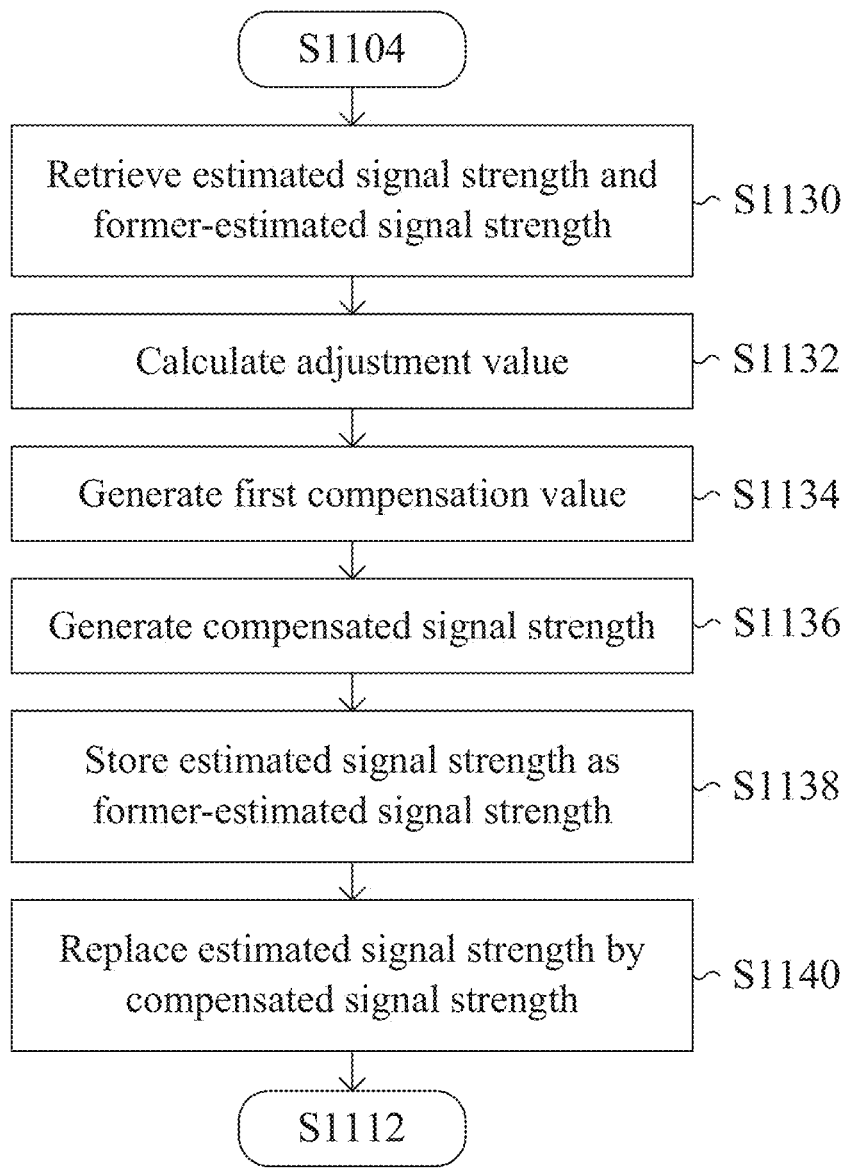
FIG. 11B is a flow chart of a first-phase compensation operation in accordance with one embodiment of the present invention.

One embodiment is described below to further explain how the first-phase compensation operation is performed. Please refer to FIG. 11B, which is a flow chart of a first-phase compensation operation in accordance with one embodiment of the present invention. In this embodiment, for each of the actual measuring locations within the second specific range around the signal compensation location, the estimated signal strength and former-estimated signal strength corresponded thereto are retrieved and a corresponded adjustment value is calculated by subtracting the estimated signal strength from the former-estimated signal strength in the step S1132. After obtaining the adjustment values each corresponding to one of the actual measuring locations within the second specific range around the signal compensation location, a first compensation value is calculated by the first-phase compensation operation by averaging the adjustment values in the step S1134. Because the first compensation value is generated in accordance with the former-estimated signal strength obtained before measurement and the estimated signal strength obtained after measurement, the first compensation value represents to a certain extent that a trend in which the signal strengths estimated originally varies to the signal strengths measured by tools around the signal compensation location. Therefore, the compensated signal strength of the signal compensation location can be generated by subtracting the first compensation value from the estimated signal strength corresponding to the signal compensation location in the step S1136. In this embodiment, the estimated signal strength corresponding to the signal compensation location is stored to be the former-estimated signal strength corresponding to the signal compensation location in the step S1138, and then the estimated signal strength corresponding to the signal compensation location is replaced by the compensated signal strength in the step S1140. It can be known from above that the first-phase compensation operation in this embodiment is achieved by referring to the estimated signal strengths and the former-estimated signal strengths corresponding to the actual measuring locations around the signal compensation location.

In the embodiment described above, the flow goes back to the step S1112 of FIG. 11A to remove the identity representing processing the signal compensation location by the first-phase compensation operation such that the estimation location corresponding to the signal compensation location being processed by the first-phase compensation operation is not deemed one of the signal compensation locations anymore. The step S1112 could be achieved by many ways other than that mentioned above. For example, a flag can be added into the data of each of the estimation locations being set as one of the signal compensation locations while performing the step S1100 such that the flag equals to the identity representing the signal compensation location. Accordingly, one can remove the identity representing the signal compensation location easily by removing the flag in the corresponded data. In another embodiment, the flag mentioned above can be kept and the content of the flag can be varied in accordance with variation of the identity representing corresponded estimation location. Accordingly, the identity representing the signal compensation location of the corresponded estimation location can be removed easily by setting the flag to be with a predetermined content.

Similarly, the method to vary the identity of the estimation location by using flags can be applied to the operations of the step S1106, such that the object of classifying the signal compensation locations into the group in which the signal compensation locations are prepared to be processed by the second-phase compensation operation can be achieved. For example, a flag can be added by the step S1106 to represent that an identity representing waiting for being processed by the second-phase compensation operation is added to the corresponded estimation location. In another embodiment, the identity representing waiting for being processed by the second-phase compensation operation of the estimation location can be set by amending the content of the flag of the estimation location.

Figure 12B:
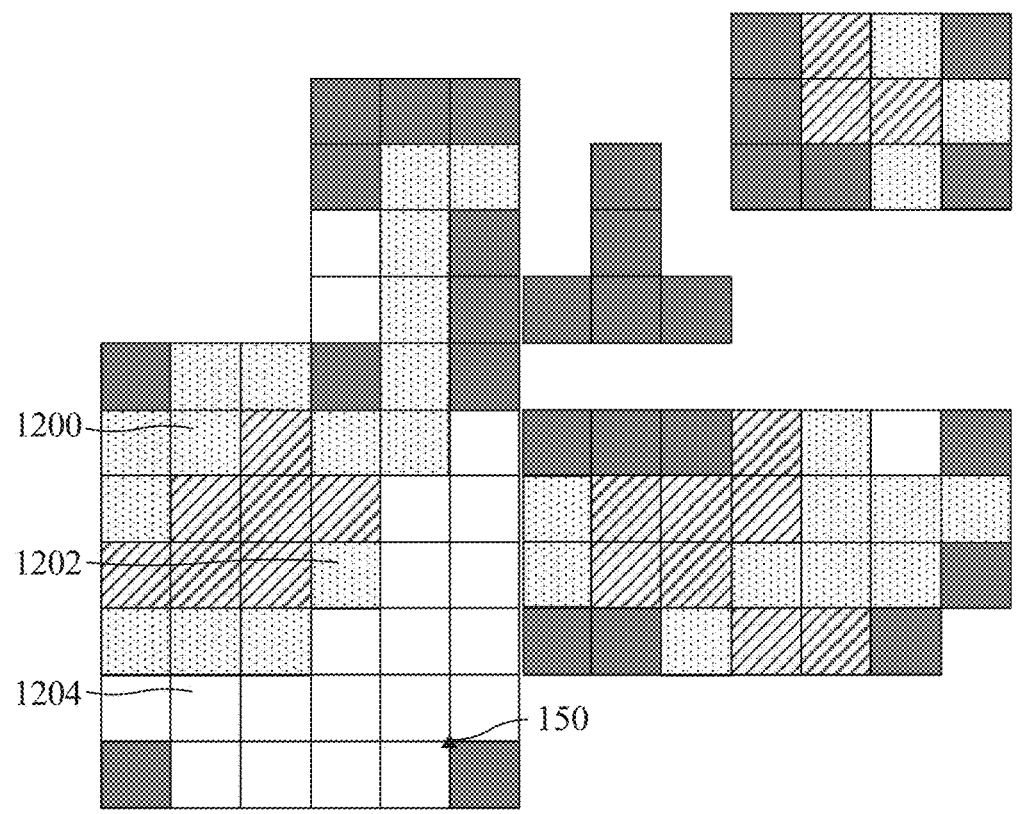
FIG. 12B is a schematic diagram shown the estimation locations after the first-phase compensation operation is completed in accordance with the embodiment shown in FIG. 12A.

By using the technique solutions provided above, some of the signal compensation locations set in the step S1100 are processed by the first-phase compensation operation while others are processed by the second-phase compensation operation. Please refer to FIG. 12B, which is a schematic diagram shown the estimation locations after the first-phase compensation operation is completed in accordance with the embodiment shown in FIG. 12A. The marking style made in FIG. 12B is inherited from FIG. 12A, and the estimation locations which have been processed by the first-phase compensation operation are represented by rectangular frames filled with dots. In FIG. 12B, the rectangular frames representing the signal compensation locations 1200 and 1202 are filled with dots since the signal compensation locations 1200 and 1202 have been processed by the first-phase compensation operation, and the rectangular frame representing the signal compensation location 1204 remains clear since the signal compensation operation 1204 is not conformed to the specific condition defined in the step S1104 such that the signal compensation location 1204 is not qualified to be processed by the first-phase compensation operation and is waiting to be processed by the second-phase compensation operation.

Please refer to FIG. 10 again. The step S1004 in which the first-phase compensation operation is performed and the step S1006 in which removing the identity representing the signal compensation location of the estimation locations after being processed by the first-phase compensation operation is performed are described in detail in the embodiments above. Furthermore, by referring to the descriptions made in the embodiments above, technicians would be capable of working out how the step S1008 is achieved from the embodiment shown in FIG. 11A. To put the step S1008 simply, those signal compensation locations conformed to the specific condition and not processed by the first-phase compensation operation could be retrieved by applying the operations performed in the steps S1102 and S1104. This approach could be easily achieved by referring to the descriptions made above and is not explained here.

As shown in FIG. 10, after the steps relating to the first-phase compensation operation are completed, the flow goes to the steps S1010~S1016 which relate to the second-phase compensation operation. According to the descriptions made above, members of the target group for which the second-phase compensation operation is performed are the estimation locations without corresponded former-estimated signal strengths. Besides, compared to the first-phase compensation operation which is performed in accordance with the estimated signal strengths and former-estimated signal strengths corresponding to the actual measuring locations around the signal compensation location, the second-phase compensation operation is performed in accordance with the amount of the estimation locations with corresponded former-estimated signal strength and within a specific range around the signal compensation location and positions and an amount of the actual measuring locations neighboring to the signal compensation location. The technique solutions relating to the second-phase compensation operation are described below with accompanying drawings.

Figure 13A:
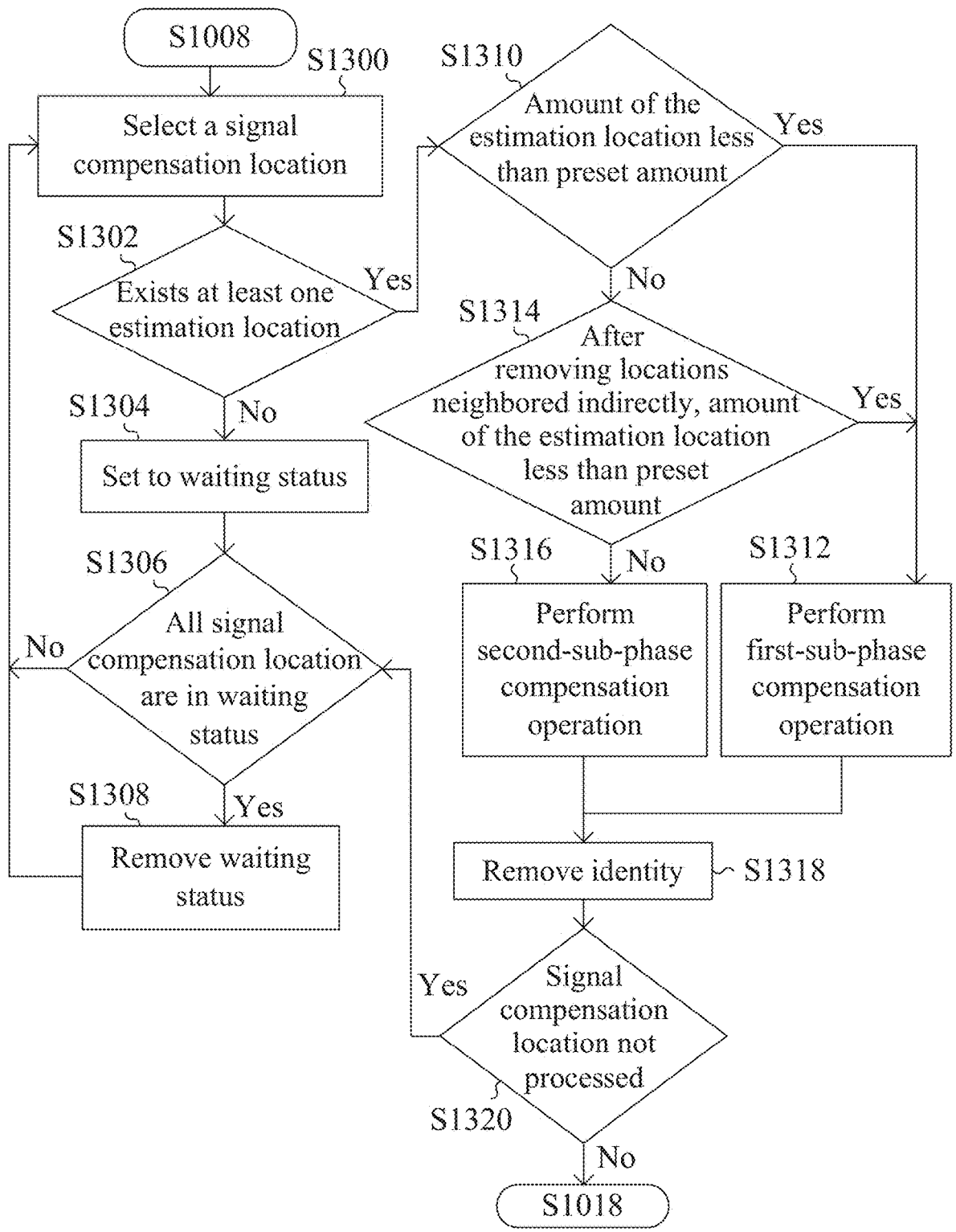
FIG. 13A is a flow chart shown detailed operation of the steps S1010~S1016 performed by a method for compensating estimated wireless signal strength in accordance with one embodiment of the present invention.

Please refer to FIG. 13A, which is a flow chart shown detailed operation of the steps S1010~S1016 performed by a method for compensating estimated wireless signal strength in accordance with one embodiment of the present invention. In this embodiment, one of the signal compensation locations which are not in a waiting status is selected in the step S1300, wherein all the signal compensation locations remained at the time when the step S1100 is performed for the first time are not in the waiting status, and one of the signal compensation locations are set to the waiting status only when some conditions are satisfied during operations performed subsequently. The technique solutions are described in detail below.

After selecting the signal compensation location in the step S1300, it is determined that whether there exists at least one estimation location with corresponded former-estimated signal strength within the specific range around the selected signal compensation location in the step S1302, wherein the specific range is the same as the second specific range, which is covered by a 3*3 matrix centered at the selected signal compensation location, as mentioned in the embodiments discussed before. When there exists at least one estimation location with corresponded former-estimated signal strength within the specific range around the selected signal compensation location, it is determined that the selected signal compensation location is qualified to be processed by the second-phase compensation operation such that the flow goes to the step S1310 to perform subsequent operations. On the contrary, when all the estimation locations within the specific range around the selected signal compensation location are with no corresponded former-estimated signal strengths, which is referred to as a first situation hereinafter, it is determined that the selected signal compensation location is not qualified to be processed by the second-phase compensation operation, and the selected signal compensation location is set to be in the waiting status in the step S1304. After setting the selected signal compensation location to be in the waiting status, the step S1306 further determines whether all the signal compensation locations are in the waiting status. When at least one signal compensation location is not in the waiting status, which represents that not all the signal compensation locations have been selected by the step S1300, the flow goes to the step S1300 to select one of the signal compensation locations not in the waiting status. On the contrary, when all the signal compensation locations are in the waiting status, which represents that all the signal compensation locations have been selected once by the step S1300, they are set to be not in the waiting status in the step S1308 and the flow goes to the step S1300 for proceeding a new round of the compensation operation.

It can be understood from the description made above that functionality of selecting the signal compensation locations suitable for being processed by the second-phase compensation operation, which is needed in the step S1010, could be accomplished by using the steps S1300~S1308. Furthermore, the technique solution to set the signal compensation location to be in the waiting status could be similar but not limited to the technique solution of setting the estimation location to be the signal compensation location or the actual measuring location.

Inherit from the description made above, the flow will go to the step S1310 for further determining whether the amount of the estimation locations with corresponded former-estimated signal strength within the specific range around the selected signal compensation location is less than a second preset amount after the selected signal compensation location is determined to be suitable for being processed by the second-phase compensation location in the step S1302. The second preset amount is set to 2 in this embodiment so that enough references could be obtained for compensation to prevent the signal strengths from being erroneously compensated due to insufficient references. However, the second preset amount in the present invention is not limited to that set in this embodiment. Technicians could vary the second preset amount in accordance with actual needs.

When the result of the determination made in the step S1310 is true, a second situation is fulfilled accordingly, and the selected signal compensation location is processed by a first-sub-phase compensation operation in the step S1312. On the contrary, when the result of the determination made in the step S1310 is false, that is, the amount of the estimation locations within the specific range around the selected signal compensation location is not less than the second preset amount, it is further determined that whether an amount obtained by subtracting an amount of the actual measuring location neighboring indirectly to the selected signal compensation location from the amount of the estimation locations with corresponded former-estimated signal strength and within the specific range around the selected signal compensation location is less than the second preset amount in the step S1314. When the result of the determination made in the step S1314 is true, the selected signal compensation location is processed by the first-sub-phase compensation operation in the step S1312, too. On the contrary, when the result of the determination made in the step S1314 is false, a third situation is fulfilled, and the selected signal compensation location is processed by a second-sub-phase compensation operation different from the first-sub-phase compensation operation in the step S1316.

The selected signal compensation location should not be compensated by other operations after it is compensated by performing the first-sub-phase compensation operation or the second-sub-phase compensation operation thereon. Accordingly, after completing the step S1312 or the step S1316, an identity representing the signal compensation location of the selected signal compensation location is removed in this embodiment in the step S1318. After completing the step S1318, the method for compensating estimated signal strength provided in this embodiment further determines whether there exists any signal compensation location in the step S1320. When the result of the determination made by the step S1320 is true, the flow goes to the Step S1306 to perform subsequent operations. On the contrary, when the result of the determination made by the step S1320 is false, which represents that all the signal compensation locations are compensated once such that each estimation location is with a corresponded former-estimated signal strength, the flow goes to the step S1018 to determine the signal strength distribution within the specific area in accordance with the estimated signal strength corresponding to each estimation location.

The first-sub-phase compensation operation and the second-sub-phase compensation operation are described in detail below with accompanying drawings.

Figure 13B:
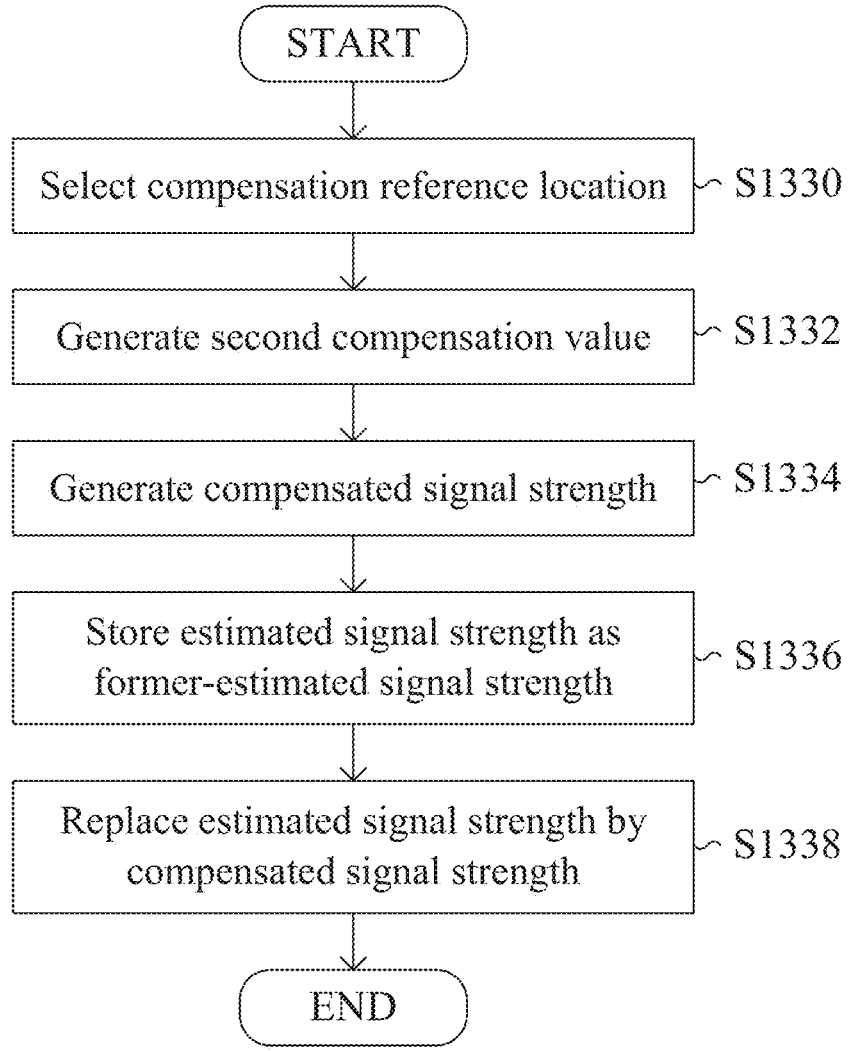
FIG. 13B is a flow chart of first-sub-phase compensation operation in accordance with one embodiment of the present invention.

Please refer to FIG. 13B, which is a flow chart of first-sub-phase compensation operation in accordance with one embodiment of the present invention. In this embodiment, a compensation reference location is selected from the estimation locations in the step S1330, wherein, the compensation reference location is one of the estimation locations, which are with the former-estimated signal strength corresponded thereto and within the specific range around the signal compensation location, and a straight-line distance between the compensation reference location and the signal emitter is shorter than the straight-line distance between anyone of the estimation locations, which are with the former-estimated signal strength and within the specific range around the signal compensation location, and the signal emitter. After that, the estimated signal strength and the former-estimated signal strength corresponding to the compensation reference location are retrieved, and a second compensation value is generated by subtracting the estimated signal strength corresponding to the compensation reference location from the former-estimated signal strength corresponding to the compensation reference location in the step S1332. Finally, the compensated signal strength corresponding to the signal compensation location is generated by subtracting the second compensation value from the estimated signal strength corresponding to the signal compensation location in the step S1334. After obtaining the compensated signal strength, the estimated signal strength corresponding to the signal compensation location is stored as the former-estimated signal strength corresponding to the signal compensation location in the step S1336, and then the estimated signal strength corresponding to the signal compensation location is replaced by the compensated signal strength corresponding to the signal compensation location in the step S1338.

Figure 13C:
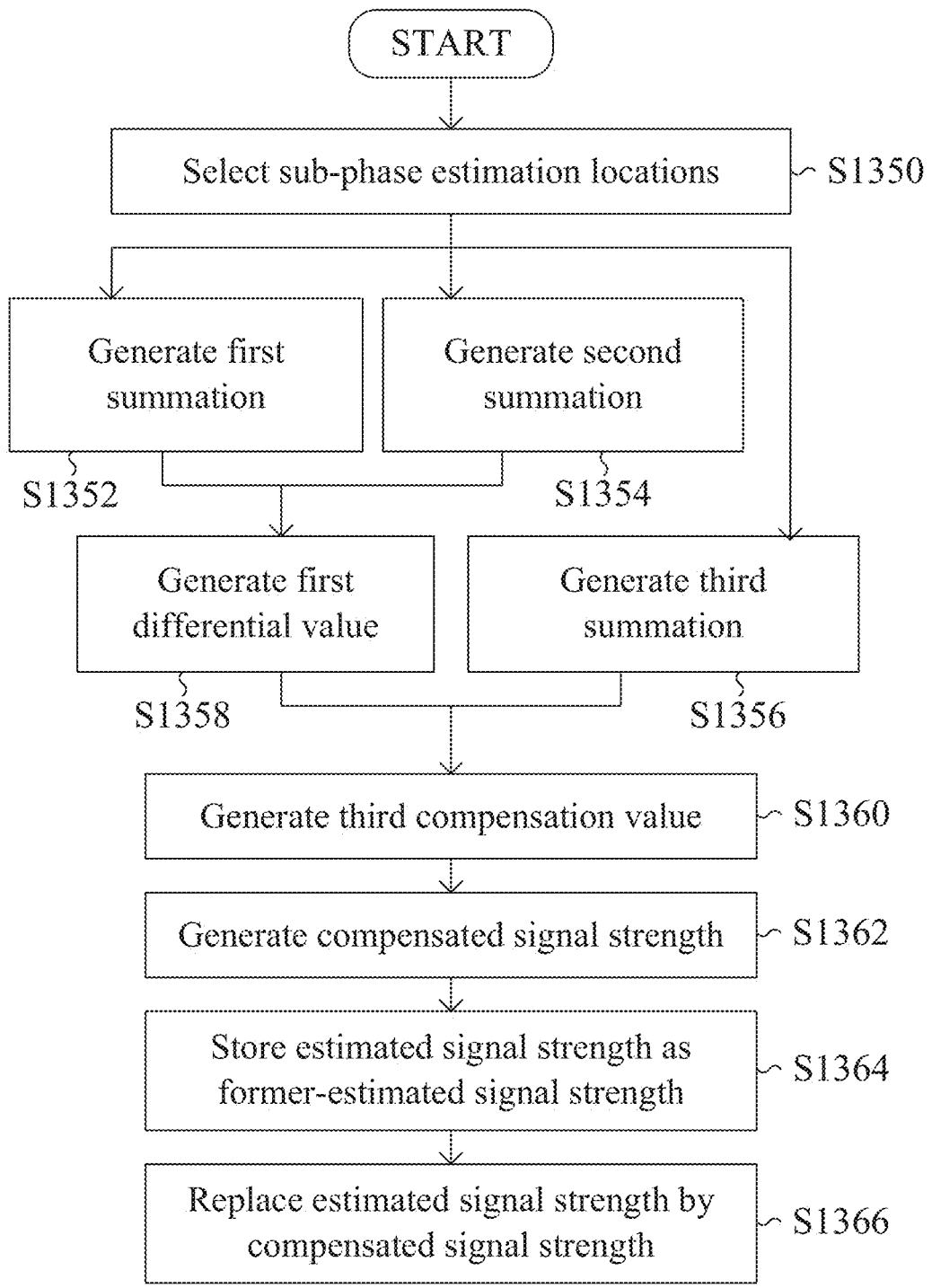
FIG. 13C is a flow chart of second-sub-phase compensation operation in accordance with one embodiment of the present invention.

Please refer to FIG. 13C, which is a flow chart of second-sub-phase compensation operation in accordance with one embodiment of the present invention. In this embodiment, the estimation locations neighboring directly to the selected signal compensation location and with corresponded former-estimated signal strengths are selected, wherein the selected estimation locations are referred to as sub-phase estimation locations hereinafter, and the actual measuring locations neighboring indirectly to the selected signal compensation location are also selected in the step S1350. After obtaining the sub-phase estimation locations and the actual measuring locations acquired by the step S1350, the former-estimated signal strengths corresponding to the sub-phase estimation locations and the actual measuring locations acquired by the step S1350 are retrieved and added to generate a first summation in the step S1352. Furthermore, the estimated signal strengths corresponding to the sub-phase estimation locations and the actual measuring locations acquired by the step S1350 are retrieved and added to generate a second summation in the step S1354. Moreover, an amount of the sub-phase estimation locations and an amount of the actual measuring locations acquired by the step S1350 are retrieved and added to generate a third summation in the step S1356. After that, a first differential value is generated by subtracting the second summation from the first summation in the step S1358, and a third compensation value is generated by dividing the first differential value by the third summation in the step S1360.

It can be known from the descriptions made above that the third compensation value is the average of the summation obtained by adding the differences each of which is generated subtracting the estimated signal strength from the former-estimated signal strength for one of the sub-phase estimation locations and the actual measuring acquired by the step S1350. That is, assuming N sub-phase estimation locations and M actual measuring locations are acquired by the step S1350, the third compensation value can be generated by the equation (1) shown below:

$$(\Sigma_{m=1}^{N}(SAn-SBn)+\Sigma_{m=1}^{M}(TAm-TBm))/(N+M) \quad (1)$$

Wherein, SAn represents the former-estimated signal strength corresponding to the nth sub-phase estimation location, SBn represents the estimated signal strength corresponding to the nth sub-phase estimation location, TAm represents the former-estimated signal strength corresponding to the mth actual measuring location acquired by the step S1350, and TBm represents the estimated signal strength corresponding to the mth actual measuring location acquired by the step S1350.

It is noted that any equation being capable of generating the third compensation value can be used in the present invention, and the equation (1) shown above is not a limitation of the present invention.

Inherit from the description made above, after generating the third compensation value, the compensated signal strength corresponding to the selected signal compensation location is generated by subtracting the third compensation value from the estimated signal strength corresponding to the signal compensation location in the step S1362. After that, the estimated signal strength corresponding to the selected signal compensation location is stored as the former-estimated signal strength corresponding to the selected signal compensation location in the step S1364, and then the estimated signal strength corresponding to the selected signal compensation location is replaced by the compensated signal strength in the step S1366 to complete the second-phase compensation operation performed for the selected signal compensation location.

Figure 12C:
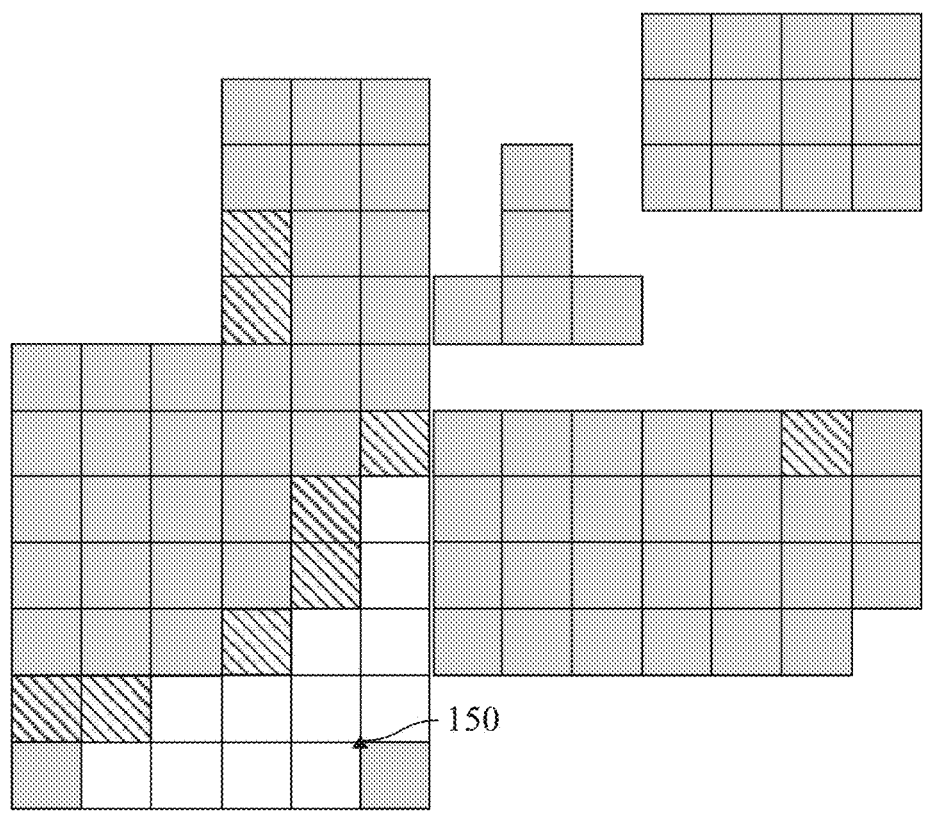
FIG. 12C is a schematic diagram shown the estimation locations after completing the second-phase compensation operation for the first time in accordance with the embodiment shown in FIG. 12A.

Please refer to FIG. 12C, which is a schematic diagram shown the estimation locations after completing the second-phase compensation operation for the first time in accordance with the embodiment shown in FIG. 12A. In order to simplify the drawings, the actual measuring locations and the estimation locations processed by the first-phase compensation operation marked in FIG. 12B are represented by the rectangular frames filled with shadows, the estimation locations compensated during the time the second-phase compensation operation being performed for the first time are represented by the rectangular frames filled with backslashes. Because there exist estimation locations which have not been compensated after the second-phase compensation operation is performed for the first time for the target group, the second-phase compensation operation is performed again (for the second time) for trying to compensate the estimated signal strength corresponding to the estimation locations in a renewed target group.

Figure 12D:
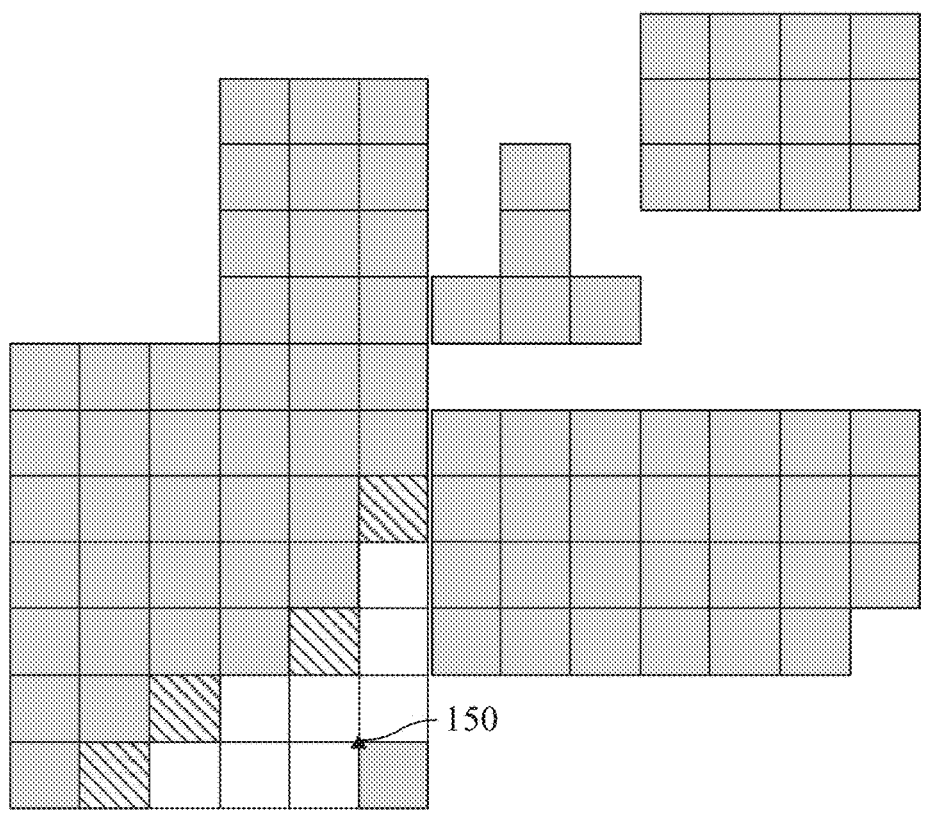
FIG. 12D is a schematic diagram shown the estimation locations after completing the second-phase compensation operation for the second time in accordance with the embodiment shown in FIG. 12A.

Please refer to FIG. 12D, which is a schematic diagram shown the estimation locations after completing the second-phase compensation operation for the second time in accordance with the embodiment shown in FIG. 12A. The estimation locations which are compensated by performing the second-phase compensation operation for the first time and are represented by the rectangular frames filled with backslashes in FIG. 12C are also represented by the rectangular frames filled with shadows in FIG. 12D, and the estimation locations compensated by performing the second-phase compensation operation for the second time for the target group renewed before are represented by the rectangular frames filled with backslashes. Because there exist estimation locations which have not been compensated after the second-phase compensation operation is performed for the second time, the second-phase compensation operation is performed again (for the third time) for trying to compensate the estimated signal strength corresponding to the estimation locations within another renewed target group.

Figure 12E:
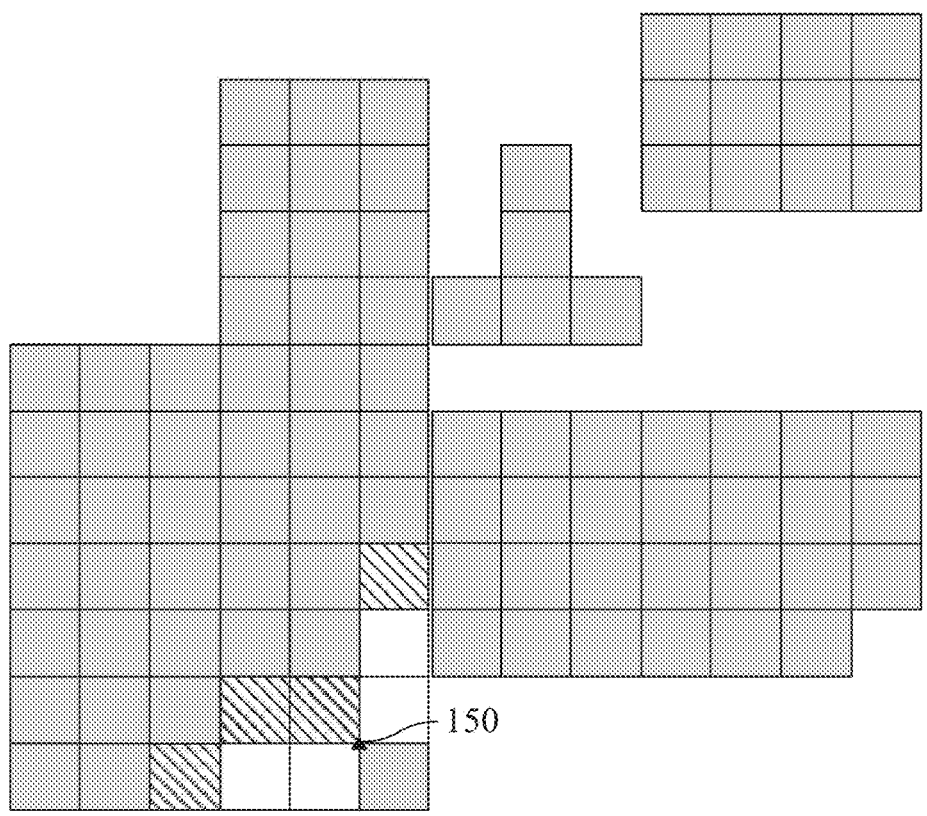
FIG. 12E is a schematic diagram shown the estimation locations after completing the second-phase compensation operation for the third time in accordance with the embodiment shown in FIG. 12A.

Please refer to FIG. 12E, which is a schematic diagram shown the estimation locations after completing the second-phase compensation operation for the third time in accordance with the embodiment shown in FIG. 12A. The estimation locations which are compensated by performing the second-phase compensation operation for the second time and are represented by the rectangular frames filled with backslashes in FIG. 12D are also represented by the rectangular frames filled with shadows in FIG. 12E, and the estimation locations compensated by performing the second-phase compensation operation for the third time for the target group renewed before are represented by the rectangular frames filled with backslashes. Because there exist estimation locations which have not been compensated after the second-phase compensation operation is performed for the third time, the second-phase compensation operation is performed again (for the fourth time) for trying to compensate the estimated signal strength corresponding to the estimation locations within a further renewed target group.

Figure 12F:
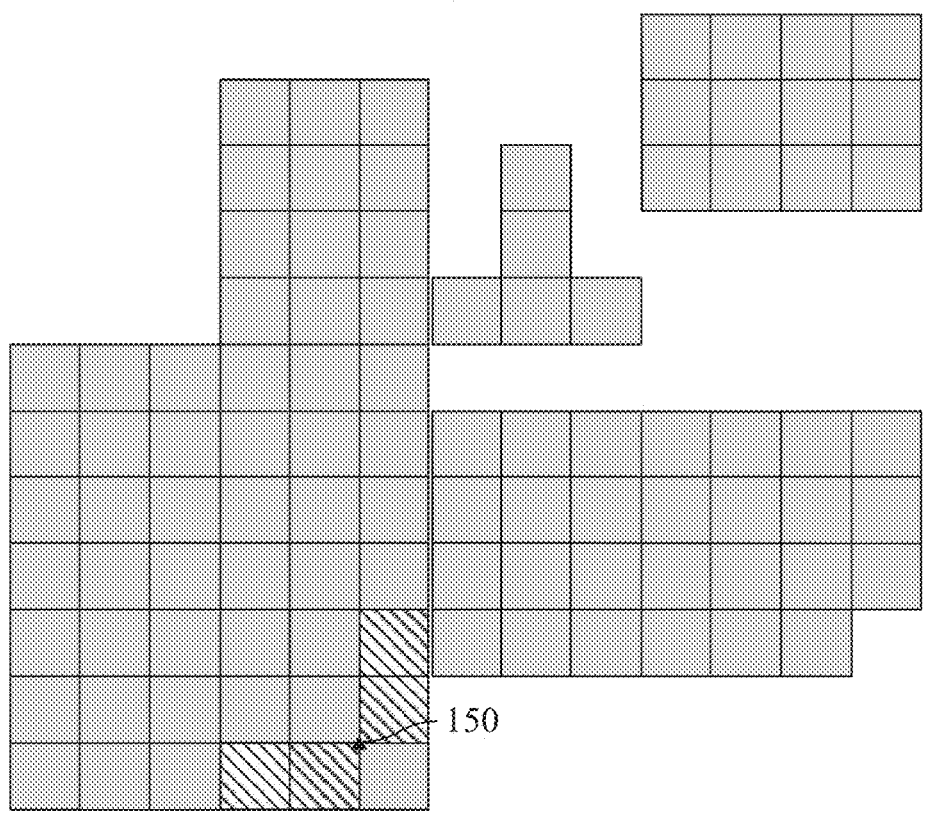
FIG. 12F is a schematic diagram shown the estimation locations after completing the second-phase compensation operation for the fourth time in accordance with the embodiment shown in FIG. 12A.

Please refer to FIG. 12F, which is a schematic diagram shown the estimation locations after completing the second-phase compensation operation for the fourth time in accordance with the embodiment shown in FIG. 12A. The estimation locations which are compensated by performing the second-phase compensation operation for the third time and are represented by the rectangular frames filled with backslashes in FIG. 12E are also represented by the rectangular frames filled with shadows in FIG. 12F, and the estimation locations compensated by performing the second-phase compensation operation for the fourth time for the target group renewed before are represented by the rectangular frames filled with backslashes.

Because there are no estimation locations which have not been compensated after the second-phase compensation operation is performed for the fourth time, all the compensation operations are closed accordingly. Finally, the estimated signal strengths existed after the measurement operation and all the compensation operations are completed are used to determine the signal strength distribution within the specific area 10.

It can be known through the technique solution provided above that, by using the method for estimating distribution of wireless signal strength, selecting measuring locations to measure wireless signal strength and compensating estimated wireless signal strength provided by the present invention, the signal strength distribution could be roughly estimated by using a plurality of single-reflection paths, and some positions within the specific area could be selected for performing signal measuring such that signal strength distribution in each location could be further estimated by using the method for compensating estimated wireless signal strength with the measured signal strength and the roughly estimated signal strength. The number of operations performed for measuring could be reduced by using the technology provided in the present invention such that the time and manpower needed for determining the wireless signal strength is reduced. Furthermore, by applying the signal strength estimating method different from those used in prior art, the present invention could also estimate the wireless signal strength accurately.

What is claimed is:

1. A method for estimating distribution of wireless signal strength, which is adapted to estimating a signal strength distribution of a wireless signal emitted from a signal emitter within a specific area in accordance with a planar view of the specific area, wherein the planar view shows partition walls, doors and passage within the specific area, comprising:
  deciding a plurality of estimation locations within the specific area;
  performing an estimation operation for each of the estimation locations, wherein the estimation operation performed for a current estimation location, which is one of the estimation locations, comprises:
    determining whether the current estimation location is within line of sight of the signal emitter;
    performing a first estimation procedure for estimating an estimated signal strength in the current estimation location when the current estimation location is within line of sight of the signal emitter; and
    performing a second estimation procedure for estimating the estimated signal strength in the current estimation location when the current estimation location is not within line of sight of the signal emitter; and
  determining the signal strength distribution within the specific area in accordance with a plurality of the estimated signal strengths corresponding to the estimation locations;
  wherein, the first estimation procedure is different from the second estimation procedure, and the first estimation procedure estimates the estimated signal strength in the current estimation location by considering at least two single-reflection paths starting from the signal emitter to the current estimation location.

2. The method according to claim 1, wherein the first estimation procedure estimates the estimated signal strength in the current estimation location by considering all single-reflection paths starting from the signal emitter to the current estimation location.

3. The method according to claim 1 further comprising following steps before determining the signal strength distribution within the specific area in accordance with the plurality of the estimated signal strengths corresponding to the estimation locations:

performing a location selecting operation to select at least one actual measuring location from the estimation locations; and performing a signal renew operation for each of the at least one actual measuring location to record a signal measurement value obtained by measuring the wireless signal in corresponding one of the at least one actual measuring location.

4. The method according to claim 3, wherein the signal renew operation comprises:

measuring a wireless signal strength of the wireless signal in the actual measuring location to obtain the signal measurement value corresponding to the actual measuring location; and replacing the estimated signal strength corresponding to the actual measuring location with the signal measurement value corresponding to the actual measuring location after storing the estimated signal strength corresponding to the actual measuring location as a former-estimated signal strength corresponding to the actual measuring location.

5. The method according to claim 4, wherein the location selecting operation comprises:

selecting one of the estimation locations, which have not been considered by the location selecting operation, as a determining location, and performing a determination operation for the determining location, wherein the determination operation comprises:

when a position of the determining location is conformed to a preset rule, setting the determining location as one of the at least one actual measuring location and closing the determination operation performed for the determining location; and when the position of the determining location is not conformed to the preset rule, generating a differential weight corresponding to the determining location by summing a signal differential value and a variation value, wherein the signal differential value is a summation of at least one absolute value of differential, each of which is obtained from comparing a location signal strength and a neighboring-location signal strength, and the variation value is a coefficient of variation of a set composed of all the estimated signal strengths, each of which corresponds to one of the estimation locations within a specific range around the determining location, wherein the location signal strength is the estimated signal strength corresponding to the determining location, and the neighboring-location signal strength is the estimated signal strength corresponding to a neighboring location which is neighboring directly to the determining location and is closer to the signal emitter than the determining location is;

generating a location differential threshold corresponding to the determining location by summing a signal differential threshold and a variation threshold, wherein the signal differential threshold corresponding to the determining location is a predetermined value, and the variation threshold is determined in accordance with the location signal strength and a parameter set determined previously;

when the differential weight is greater than the location differential threshold, setting the determining location as one of the at least one actual measuring location and closing the determination operation performed for the determining location; and when the differential weight is not greater than the location differential threshold, closing the determination operation performed for the determining location.

6. The method according to claim 5, wherein the step of when the position of the determining location is conformed to the preset rule, setting the determining location as one of the at least one actual measuring location and closing the determination operation performed for the determining location, comprises:

when the position of the determining location is in one concave corner of the specific area, setting the determining location as one of the at least one actual measuring location and closing the determination operation performed for the determining location;

when the position of the determining location is in one corner of the specific area and is not neighboring to any of the estimation locations located in anyone of the concave corners of the specific area, setting the determining location as one of the at least one actual measuring location and closing the determination operation performed for the determining location;

when the position of the determining location is in front of one closed door of the specific area, setting the determining location as one of the at least one actual measuring location and closing the determination operation performed for the determining location;

when the position of the determining location is within any passage of the specific area or near any entrance of any passage of the specific area, setting the determining location as one of the at least one actual measuring location and closing the determination operation performed for the determining location; and when the position of the determining location is in front of or in either side in front of one opened door of the specific area, setting the determining location as one of the at least one actual measuring location and closing the determination operation performed for the determining location.

7. The method according to claim 5, further comprising following steps before generating the differential weight corresponding to the determining location by summing the signal differential value and the variation value:

obtaining the variation value; and obtaining the signal differential value, comprising:

selecting, from a plurality of strength grades, a current strength grade in which the location signal strength is included;

for each of the at least one neighboring-location signal strength, selecting, from the strength grades, a neighbor grade in which the neighboring-location signal strength is included and calculating absolute value of differential between the current strength grade and the neighbor grade to generate a differential component value; and generating the signal differential value by summing all the differential component values, each of which corresponds to one of the at least one neighboring-location signal strength.

8. The method according to claim 5, wherein the step in which the variation threshold is determined in accordance with the location signal strength and the parameter set determined previously comprises:

calculating a first variation threshold component, wherein the first variation threshold component is a coefficient of variation of a first data set including a first amount of data each being the location signal strength and a second amount of data each being the location signal strength plus a preset value;

calculating a second variation threshold component, wherein the second variation threshold component is a coefficient of variation of a second data set including the first amount of data each being the location signal strength and the second amount of data each being the location signal strength minus the preset value;

calculating a third variation threshold component, wherein the third variation threshold component is a coefficient of variation of a third data set including the second amount of data each being the location signal strength and a first amount of data each being the location signal strength plus the preset value;

calculating a fourth variation threshold component, wherein the fourth variation threshold component is a coefficient of variation of a fourth data set including the second amount of data each being the location signal strength and a first amount of data each being the location signal strength minus the preset value; and generating the variation threshold by averaging the first variation threshold component, the second variation threshold component, the third variation threshold component and the fourth variation threshold component;

wherein, the first amount is different from the second amount, and summation of the first amount and the second amount equals to an amount of the estimation locations located within the specific range.

9. The method according to claim 5, wherein the signal differential threshold of the determining location within line of sight of the signal emitter is different from the signal differential threshold of the determining location out of line of sight of the signal emitter.

10. The method according to claim 4, further comprising following steps after performing the signal renew operation and before determining the signal strength distribution within the specific area in accordance with the plurality of the estimated signal strengths corresponding to the estimation locations:

taking each of the estimation locations without corresponded former-estimated signal strength as a signal compensation location;

performing a first-phase compensation operation for the signal compensation location in accordance with the estimated signal strength and the former-estimated signal strength corresponding to the at least one actual measuring location within a specific range around the signal compensation location to obtain a compensated signal strength corresponding to the signal compensation location and then replace the estimated signal strength corresponding to the signal compensation location with the compensated signal strength corresponding to the signal compensation location when an amount of the at least one actual measuring location within the specific range around the signal compensation location is not less than a first preset amount; and performing at least one second-phase compensation operation for the signal compensation location in accordance with an amount of the estimation locations, which are within the specific range around the signal compensation location and are with corresponded former-estimated signal strengths, and the position and an amount of the at least one actual measuring location neighboring to the signal compensation location to obtain the compensated signal strength corresponding to the signal compensation location and to replace the estimated signal strength corresponding to the signal compensation location with the compensated signal strength corresponding to the signal compensation location after the first-phase compensation operation is performed for all the estimation locations suitable for performing the first-phase compensation operation when the amount of the at least one actual measuring location within the specific range around the signal compensation location is less than the first preset amount.

11. The method according to claim 10, wherein the first-phase compensation operation comprises:

generating a first compensation value corresponding to the signal compensation location by averaging a plurality of first results corresponding to all the at least one actual measuring location within the specific range around the signal compensation location, wherein each of the first results is corresponded to one of the at least one actual measuring location within the specific range around the signal compensation location and is obtained from subtracting the estimated signal strength corresponding to the corresponded actual measuring location from the former-estimated signal strength corresponding to the corresponded actual measuring location;

generating the compensated signal strength corresponding to the signal compensation location by subtracting the first compensation value corresponding to the signal compensation location from the estimated signal strength corresponding to the signal compensation location; and closing the first-phase compensation operation performed for the signal compensation location after storing the estimated signal strength corresponding to the signal compensation location as the former-estimated signal strength corresponding to the signal compensation location before replacing the estimated signal strength corresponding to the signal compensation location with the compensated signal strength corresponding to the signal compensation location.

12. The method according to claim 11, wherein a target group considered by the second-phase compensation operation comprises the estimation locations, each of which is without the former-estimated signal strength corresponded thereto, and, after all the estimation locations within the target group are considered by the second-phase compensation operation, the target group is renewed and the second-phase compensation operation is performed to consider all the estimation locations within the renewed target group until each of the estimation locations is with the former-estimated signal strength corresponded thereto, wherein the second-phase compensation operation comprises:

closing the second-phase compensation operation performed for the signal compensation location under a first situation, in which each of the estimation locations within the specific range around the signal compensation location is without the former-estimated signal strength corresponded thereto;

performing a first-sub-phase compensation operation for the signal compensation location under a second situation, in which the amount of the estimation locations, which are within the specific range around the signal compensation location and are with corresponded former-estimated signal strengths, is less than a second preset amount and not equal to zero, or, when the amount of the estimation locations, which are within the specific range around the signal compensation location and are with corresponded former-estimated signal strengths, is not less than the second preset amount but a second result obtained by subtracting an amount of the actual measuring location neighboring indirectly to the signal compensation location from the amount of the estimation locations, which are within the specific range around the signal compensation location and are with corresponded former-estimated signal strengths, is less than the second preset amount, wherein the first-sub-phase compensation operation comprises:

selecting a compensation reference location, wherein the compensation reference location is one of the estimation locations with the former-estimated signal strength corresponded thereto and within the specific range around the signal compensation location, and a straight-line distance between the compensation reference location and the signal emitter is shorter than the straight-line between anyone of the estimation locations, which is with the former-estimated signal strength corresponded thereto and within the specific range around the signal compensation location, and the signal emitter;

generating a second compensation value by subtracting the estimated signal strength corresponding to the compensation reference location from the former-estimated signal strength corresponding to the compensation reference location;

generating the compensated signal strength corresponding to the signal compensation location by subtracting the second compensation value from the estimated signal strength corresponding to the signal compensation location; and closing the second-phase compensation operation performed for the signal compensation location after storing the estimated signal strength corresponding to the signal compensation location as the former-estimated signal strength corresponding to the signal compensation location before replacing the estimated signal strength corresponding to the signal compensation location with the compensated signal strength corresponding to the signal compensation location; and performing a second-sub-phase compensation operation for the signal compensation location under a third situation comprising all situations except the first and second situations, wherein the second-sub-phase compensation operation comprises:

generating a first summation by adding the former-estimated signal strengths each corresponding to one of the estimation locations with the former-estimated signal strength corresponded thereto and neighboring directly to the signal compensation location and the former-estimated signal strengths each corresponding to one of the at least one actual measuring location neighboring indirectly to the signal compensation location;

generating a second summation by adding the estimated signal strengths each corresponding to one of the estimation locations with the former-estimated signal strength corresponded thereto and neighboring directly to the signal compensation location and the estimated signal strengths each corresponding to one of the at least one actual measuring location neighboring indirectly to the signal compensation location;

generating a third summation by adding an amount of the estimation locations and an amount of the at least one actual measuring location neighboring indirectly to the estimation location, wherein each of the amount of the estimation locations is with the former-estimated signal strength corresponded thereto and neighboring directly to the signal compensation location;

generating a first differential value by subtracting the second summation from the first summation;

generating a third compensation value by dividing the first differential value by the third summation;

generating the compensated signal strength corresponding to the signal compensation location by subtracting the third compensation value from the estimated signal strength corresponding to the signal compensation location; and closing the second-phase compensation operation performed for the signal compensation location after storing the estimated signal strength corresponding to the signal compensation location as the former-estimated signal strength corresponding to the signal compensation location before replacing the estimated signal strength corresponding to the signal compensation location with the compensated signal strength corresponding to the signal compensation location.

13. The method according to claim 1, further comprising: drawing a diagram in accordance with the signal strength distribution within the specific area.

14. A method for selecting measuring locations to measure wireless signal strength, which is adapted to estimating a signal strength distribution of a wireless signal emitted from a signal emitter within a specific area in accordance with a planar view of the specific area, wherein the planar view shows partition walls, doors and passage within the specific area, comprising:

deciding a plurality of estimation locations within the specific area, wherein each of the estimation locations is with an estimated signal strength corresponded thereto; and selecting one of the estimation locations which have not been considered by a location selecting operation as a determining location, and performing a determination operation for the determining location, wherein the determination operation comprises:

when a position of the determining location is conformed to a preset rule, setting the determining location as one of at least one actual measuring location and closing the determination operation performed for the determining location; and when the position of the determining location is not conformed to the preset rule, generating a differential weight corresponding to the determining location by summing a signal differential value and a variation value, wherein the signal differential value is a summation of at least one absolute value of differential, each of which is obtained from comparing a location signal strength and a neighboring-location signal strength, and the variation value is a coefficient of variation of a set composed of all the estimated signal strengths, each of which corresponds to one of the estimation locations within a specific range around the determining location, wherein the location signal strength is the estimated signal strength corresponding to the determining location, and the neighboring-location signal strength is the estimated signal strength corresponding to a neighboring location which is neighboring directly to the determining location and is closer to the signal emitter than the determining location is;

generating a location differential threshold corresponding to the determining location by summing a signal differential threshold and a variation threshold, wherein the signal differential threshold corresponding to the determining location is a predetermined value, and the variation threshold is determined in accordance with the location signal strength and a parameter set determined previously;

when the differential weight is greater than the location differential threshold, setting the determining location as one of the at least one actual measuring location and closing the determination operation performed for the determining location; and when the differential weight is not greater than the location differential threshold, closing the determination operation performed for the determining location.

15. The method according to claim 14, wherein the step of when the position of the determining location is conformed to the preset rule, setting the determining location as one of the at least one actual measuring location and closing the determination operation performed for the determining location, comprises:

when the position of the determining location is in one concave corner of the specific area, setting the determining location as one of the at least one actual measuring location and closing the determination operation performed for the determining location;

when the position of the determining location is in one corner of the specific area and is not neighboring to any of the estimation locations located in anyone of the concave corners of the specific area, setting the determining location as one of the at least one actual measuring location and closing the determination operation performed for the determining location;

when the position of the determining location is in front of one closed door of the specific area, setting the determining location as one of the at least one actual measuring location and closing the determination operation performed for the determining location;

when the position of the determining location is within any passage of the specific area or near any entrance of any passage of the specific area, setting the determining location as one of the at least one actual measuring location and closing the determination operation performed for the determining location; and when the position of the determining location is in front of or in either side in front of one opened door of the specific area, setting the determining location as one of the at least one actual measuring location and closing the determination operation performed for the determining location.

16. The method according to claim 14, further comprising following steps before generating the differential weight corresponding to the determining location by summing the signal differential value and the variation value:

obtaining the variation value; and obtaining the signal differential value, comprising:
selecting, from a plurality of strength grades, a current strength grade in which the location signal strength is included;

for each of the at least one neighboring-location signal strength, selecting, from the strength grades, a neighbor grade in which the neighboring-location signal strength is included and calculating absolute value of differential between the current strength grade and the neighbor grade to generate a differential component value; and generating the signal differential value by summing all the differential component values, each of which corresponds to one of the at least one neighboring-location signal strength.

17. The method according to claim 14, wherein the step in which the variation threshold is determined in accordance with the location signal strength and the parameter set determined previously comprises:

calculating a first variation threshold component, wherein the first variation threshold component is a coefficient of variation of a first data set including a first amount of data each being the location signal strength and a second amount of data each being the location signal strength plus a preset value;

calculating a second variation threshold component, wherein the second variation threshold component is a coefficient of variation of a second data set including the first amount of data each being the location signal strength and the second amount of data each being the location signal strength minus the preset value;

calculating a third variation threshold component, wherein the third variation threshold component is a coefficient of variation of a third data set including the second amount of data each being the location signal strength and a first amount of data each being the location signal strength plus the preset value;

calculating a fourth variation threshold component, wherein the fourth variation threshold component is a coefficient of variation of a fourth data set including the second amount of data each being the location signal strength and a first amount of data each being the location signal strength minus the preset value; and generating the variation threshold by averaging the first variation threshold component, the second variation threshold component, the third variation threshold component and the fourth variation threshold component;

wherein, the first amount is different from the second amount, and summation of the first amount and the second amount equals to an amount of the estimation locations located within the specific range.

18. The method according to claim 14, wherein the signal differential threshold of the determining location within line of sight of the signal emitter is different from the signal differential threshold of the determining location out of line of sight of the signal emitter.

19. A method for compensating estimated wireless signal strength, which is adapted to estimating a signal strength distribution of a wireless signal emitted from a signal emitter within a specific area in accordance with a planar view of the specific area, wherein, a plurality of estimation locations are located within the specific area, each estimation location is with an estimated signal strength corresponded thereto, and at least one of the estimation locations is set as an actual measuring location and with a former-estimated signal strength corresponded thereto, wherein the method is characterized in comprising:

taking each of the estimation locations without the former-estimated signal strength corresponded thereto as a signal compensation location;

performing a first-phase compensation operation for the signal compensation location in accordance with the estimated signal strengths and the former-estimated signal strengths corresponding to all the actual measuring locations within a specific range around the signal compensation location to obtain a compensated signal strength corresponding to the signal compensation location and then replace the estimated signal strength corresponding to the signal compensation location with the compensated signal strength corresponding to the signal compensation location when an amount of the actual measuring location within the specific range around the signal compensation location is not less than a first preset amount; and performing at least one second-phase compensation operation for the signal compensation location in accordance with an amount of the estimation locations, which are within the specific range around the signal compensation location and are with corresponded former-estimated signal strengths, and the position and an amount of the actual measuring locations neighboring to the signal compensation location to obtain the compensated signal strength corresponding to the signal compensation location and to replace the estimated signal strength corresponding to the signal compensation location with the compensated signal strength corresponding to the signal compensation location after the first-phase compensation operation is performed for all the estimation locations suitable for performing the first-phase compensation operation when the amount of the actual measuring locations within the specific range around the signal compensation location is less than the first preset amount.

20. The method according to claim 19, wherein the first-phase compensation operation comprises:

generating a first compensation value corresponding to the signal compensation location by averaging a plurality of first results corresponding to all the actual measuring locations within the specific range around the signal compensation location, wherein each of the first results is corresponded to one of the actual measuring locations within the specific range around the signal compensation location and is obtained from subtracting the estimated signal strength corresponding to the corresponded actual measuring location from the former-estimated signal strength corresponding to the corresponded actual measuring location;

generating the compensated signal strength corresponding to the signal compensation location by subtracting the first compensation value corresponding to the signal compensation location from the estimated signal strength corresponding to the signal compensation location; and closing the first-phase compensation operation performed for the signal compensation location after storing the estimated signal strength corresponding to the signal compensation location as the former-estimated signal strength corresponding to the signal compensation location before replacing the estimated signal strength corresponding to the signal compensation location with the compensated signal strength corresponding to the signal compensation location.

21. The method according to claim 20, wherein a target group considered by the second-phase compensation operation comprises the estimation locations, each of which is without the former-estimated signal strength corresponded thereto, and, after all the estimation locations within the target group is considered by the second-phase compensation operation, the target group is renewed and the second-phase compensation operation is performed to consider all the estimation locations within the renewed target group until each of the estimation locations is with the former-estimated signal strength corresponded thereto, wherein the second-phase compensation operation comprises:

closing the second-phase compensation operation performed for the signal compensation location under a first situation, in which each of the estimation locations within the specific range around the signal compensation location is without the former-estimated signal strength corresponded thereto;

performing a first-sub-phase compensation operation for the signal compensation location under a second situation, in which the amount of the estimation locations, which are within the specific range around the signal compensation location and are with corresponded former-estimated signal strengths, is less than a second preset amount and not equal to zero, or, when the amount of the estimation locations, which are within the specific range around the signal compensation location and are with corresponded former-estimated signal strengths, is not less than the second preset amount but a second result obtained by subtracting an amount of the actual measuring location neighboring indirectly to the signal compensation location from the amount of the estimation locations, which are within the specific range around the signal compensation location and are with corresponded former-estimated signal strengths, is less than the second preset amount, wherein the first-sub-phase compensation operation comprises:

selecting a compensation reference location, wherein the compensation reference location is one of the estimation locations with the former-estimated signal strength corresponded thereto and within the specific range around the signal compensation location, and a straight-line distance between the compensation reference location and the signal emitter is shorter than the straight-line between anyone of the estimation locations, which is with the former-estimated signal strength corresponded thereto and within the specific range around the signal compensation location, and the signal emitter;

generating a second compensation value by subtracting the estimated signal strength corresponding to the compensation reference location from the former-estimated signal strength corresponding to the compensation reference location;

generating the compensated signal strength corresponding to the signal compensation location by subtracting the second compensation value from the estimated signal strength corresponding to the signal compensation location; and closing the second-phase compensation operation performed for the signal compensation location after storing the estimated signal strength corresponding to the signal compensation location as the former-estimated signal strength corresponding to the signal compensation location before replacing the estimated signal strength corresponding to the signal compensation location with the compensated signal strength corresponding to the signal compensation location; and performing a second-sub-phase compensation operation for the signal compensation location under a third situation, which comprises all situations except the first and second situations, wherein the second-sub-phase compensation operation comprises:

generating a first summation by adding the former-estimated signal strengths each corresponding to one of the estimation locations with the former-estimated signal strength corresponded thereto and neighboring directly to the signal compensation location and the former-estimated signal strengths each corresponding to one of the actual measuring locations neighboring indirectly to the signal compensation location;

generating a second summation by adding the estimated signal strengths each corresponding to one of the estimation locations with the former-estimated signal strength corresponded thereto and neighboring directly to the signal compensation location and the estimated signal strengths each corresponding to one of the actual measuring locations neighboring indirectly to the signal compensation location;

generating a third summation by adding an amount of the estimation locations and an amount of the at least one actual measuring location neighboring indirectly to the estimation location, wherein each of the amount of the estimation locations is with the former-estimated signal strength corresponded thereto and neighboring directly to the signal compensation location;

generating a first differential value by subtracting the second summation from the first summation;

generating a third compensation value by dividing the first differential value by the third summation;

generating the compensated signal strength corresponding to the signal compensation location by subtracting the third compensation value from the estimated signal strength corresponding to the signal compensation location; and closing the second-phase compensation operation performed for the signal compensation location after storing the estimated signal strength corresponding to the signal compensation location as the former-estimated signal strength corresponding to the signal compensation location before replacing the estimated signal strength corresponding to the signal compensation location with the compensated signal strength corresponding to the signal compensation location.

* * * * *